(12) United States Patent
Kurosawa et al.

(10) Patent No.: US 7,071,640 B2
(45) Date of Patent: Jul. 4, 2006

(54) ROTATION DRIVE CONTROL CIRCUIT OF MULTIPHASES DIRECT CURRENT MOTOR AND THE START-UP METHOD THEREOF

(75) Inventors: Minoru Kurosawa, Takasaki (JP); Kunihiro Kawauchi, Fujioka (JP); Yasuhiko Kokami, Takasaki (JP)

(73) Assignees: Renesas Technology Corporation, Tokyo (JP); Hitachi ULSI Systems Co., Ltd., Tokyo (JP)

( * ) Notice: Subject to any disclaimer, the term of this patent is extended or adjusted under 35 U.S.C. 154(b) by 0 days.

(21) Appl. No.: 10/684,380

(22) Filed: Oct. 15, 2003

(65) Prior Publication Data

US 2004/0080293 A1    Apr. 29, 2004

(30) Foreign Application Priority Data

Oct. 21, 2002    (JP) .............................. 2002-305740

(51) Int. Cl.
*H02P 6/22*    (2006.01)
(52) U.S. Cl. ....................... 318/254; 318/431
(58) Field of Classification Search ................ 318/138, 318/254, 430–434, 720–724, 439
See application file for complete search history.

(56) References Cited

U.S. PATENT DOCUMENTS

| | | | | |
|---|---|---|---|---|
| 4,490,661 A | * | 12/1984 | Brown et al. ................ | 318/661 |
| 4,763,347 A | * | 8/1988 | Erdman ........................ | 318/254 |
| 4,876,491 A | * | 10/1989 | Squires et al. .............. | 318/138 |
| 5,028,852 A | * | 7/1991 | Dunfield ...................... | 318/254 |
| 5,177,416 A | * | 1/1993 | Inaji et al. ................... | 318/254 |
| 5,208,524 A | * | 5/1993 | Kono et al. .................. | 318/727 |
| 5,233,275 A | * | 8/1993 | Danino ........................ | 318/254 |
| 5,254,914 A | * | 10/1993 | Dunfield et al. ............ | 318/254 |
| 5,382,889 A | * | 1/1995 | Peters et al. ................ | 318/254 |

(Continued)

FOREIGN PATENT DOCUMENTS

JP         2001-275387         3/2000

(Continued)

*Primary Examiner*—Bentsu Ro
(74) *Attorney, Agent, or Firm*—Reed Smith LLP; Stanley P. Fisher, Esq.; Juan Carlos A. Marquez, Esq.

(57) ABSTRACT

In start-up control of a motor in which currents are caused to flow through any two of three phase coils to detect the polarity of a voltage induced in each de-energized phase, thereby determining the corresponding energized phase at start-up thereof, based on the polarity of the detected induced voltage, the levels of induced voltages are detected in addition to the polarity of the induced voltage for the de-energized phase to thereby determine the relationship between the magnitudes thereof, and the energized phase at the start-up is determined based on the relationship of magnitude between the polarity of each induced voltage and the level thereof. In drive control of a multi-phase DC motor wherein a driver for allowing a drive current to flow through each coil is controlled by PWM control signals, and a sine wave-shaped current is caused to flow through each coil to thereby rotatably drive the motor, positive-phase and negative-phase signals are generated as triangular wave carrier signals for generating the PWM control signals, and the PWM control signal related to the corresponding phase coil of the respective phase coils, to which a voltage of an intermediate level is applied by the driver, is generated using a carrier signal opposite in phase to a triangular wave signal used to generate the PWM control signals for other phase coils.

26 Claims, 24 Drawing Sheets

U.S. PATENT DOCUMENTS

| | | | |
|---|---|---|---|
| 5,397,972 A * | 3/1995 | Maiocchi | 318/439 |
| 5,783,917 A * | 7/1998 | Takekawa | 318/439 |
| 5,953,491 A * | 9/1999 | Sears et al. | 388/811 |
| 6,340,873 B1 | 1/2002 | Seki et al. | |
| 6,496,397 B1 | 12/2002 | Sakai et al. | |
| 6,534,936 B1 * | 3/2003 | Messenger et al. | 318/254 |
| 6,580,236 B1 * | 6/2003 | Mitsuda | 318/254 |
| 6,667,598 B1 * | 12/2003 | Shimohara | 318/811 |

FOREIGN PATENT DOCUMENTS

JP    2001-314090    4/2000

* cited by examiner

ROTATION DRIVE CONTROL CIRCUIT OF MULTIPHASES DIRECT CURRENT MOTOR AND THE START-UP METHOD THEREOF

BACKGROUND OF THE INVENTION

The present invention relates to a drive control technology for a brushless motor, and a technology effective if applied to start-up control of a three-phase DC motor and sine wave current control, e.g., a technology effective when used in a drive control device of a spindle motor, which rotatably drives a disk type storage medium like a hard disk (hard disk drive) system.

A brushless three-phase DC motor generally called a spindle motor is used to rotate a magnetic disk in a hard disk drive. The magnetic disk is rotated at high speed by the spindle motor. A read/write magnetic head is made close to the surface of the rotated magnetic disk, and information is written therein and read therefrom while the magnetic head is being moved in a radial direction of the disk.

There has heretofore been known a system in which in drive control of a brushless motor, the relationship of position between a rotor and a stator is detected using a Hall element and a coil phase to start its energization is determined from the detected positional relationship to thereby prevent the motor from being reversely rotated. However, since it becomes difficult to scale down or downsize the motor when a rotor position detector using the Hall element is attached to the motor, a sensorless motor is moving toward heavy use in the hard disk drive. In such a sensorless motor, the rotor might be reversely rotated upon starting of its rotation if the relationship of position between the rotor and stator is not recognized.

Therefore, a control system has been proposed by the present applicant, wherein such short pulse currents that a rotor does not responds, are respectively caused to flow through any two of three phase coils, and the polarity of an induced voltage appearing at each de-energized phase is detected, thereby determining the relationship of position between the rotor and a stator, and each phase to start energization is determined using characteristics in which the polarity of each induced voltage is switched every 180° as electrical degrees, whereby reverse rotation of a sensorless motor at its start-up is avoided (see Patent Document 1).

On the other hand, the hard disk drive needs a reduction in vibration of the spindle motor in order to achieve high recording densification, and a reduction in noise of the spindle motor in order to improve a work environment. Sine wave current driving is effective for the reductions in vibration and noise. To this end, the invention has been proposed wherein sine wave-shaped currents are caused to flow through coils for respective phases to thereby smoothly rotate a rotor.

Even when a drive current is caused to flow in phase with a back electromotive voltage developed in each coil, the multi-phase DC motor obtains the maximum torque. Thus, a system for detecting a back electromotive voltage developed in each coil and performing rotational drive control has generally been adopted.

However, the system for detecting the back electromotive voltage of the coil to perform the rotation drive control needs to provide a de-energized period in which no current is caused to flow through each coil, to detect the back electromotive voltage, thereby causing vibrations in rotation and leading to the occurrence of noise and vibrations. There has therefore been proposed a system wherein a current flowing through a coil is detected without detection of a back electromotive voltage to thereby form a drive waveform (see Patent Document 2).

[Patent Document 1]
  Japanese Unexamined Patent Publication No. 2001-275387

[Patent Document 2]
  Japanese Unexamined Patent Publication No. 2001-314090

SUMMARY OF THE INVENTION

As multi-phase DC motors, various motors have been put on the market, in which a magnetizing method of a rotor's magnet, the shape of an iron core, etc. have been changed to suppress vibrations, noise and variations in rotation by structural contrivances. The present inventors have found out that when the start-up control system disclosed in the patent document 1 wherein the energization start phase is determined from the polarity of the induced voltage appearing at each de-energized phase, is applied to several multi-phase DC motors that have been provided in recent years, the motors might cause reverse rotation, and hence have examined their causes. As a result, it has become clear that although the polarities of the induced voltages are switched every electrical angles of 180° as shown in FIGS. 22(B) through 22(D) in many motors, there is such a motor that the polarities of induced voltages are temporarily inverted in the neighborhood of zero crossing points of back electromotive voltages as shown in FIGS. 22(E) through 22(G), and it is feared that when the start-up control system disclosed in the patent document 1 is applied to such a motor, the motor is reversely rotated.

It has been cleared or manifested by the present inventors that the conventional sine wave current drive system of three-phase DC motor involves such problem as to be described below. FIG. 23 shows timings provided to detect currents that flow through coils in the conventional sine wave current drive system. Referring to FIG. 23, Vu, Vv and Vw respectively indicate waveforms each corresponding to one period (360 electrical degrees) of a voltage (=back electromotive force) applied to each coil, UPWM, VPWM and WPWM respectively indicate waveforms of pulse signals for PWM-controlling drivers for the respective coils, and CS indicates a triangular wave carrier signal for generating the pulse signals for PWM-controlling the drivers for the respective coils, respectively.

As shown in FIG. 23, one period of the electrical angle is classified into six sections 1 through 6 according to the relationship between magnitudes of Vu, Vv and Vw. Six states exist within the respective periods according to high/low of UPWM, VPWM and WPWM. Current detection is performed utilizing that DC currents flowing through the motor from a power supply are different according to the polarities of the UPWM, VPWM and WPWM. Since the outputs of the three phases are all taken high or low where the UPWM, VPWM and WPWM are identical in polarity, no DC currents flow. When one phase of the polarities of the UPWM, VPWM and WPWM differ, a DC current equivalent to a coil current for the one phase flows, whereby the detection of the coil current is performed. Incidentally, if currents flowing through any two of the coils are found during the respective sections, then the remaining coil current can be determined by calculation (e.g., iu=−iv−iw). Thus, the detection of the coil currents for the three phases is realized.

An enlarged waveform of a boundary portion between the sections 2 and 3 of FIG. 23 is shown in FIG. 24. The detection of currents that flow through the coils in the conventional sine wave current drive system of the three-phase DC motor was performed by, as shown in FIG. 24, generating sampling pulses SH in synchronism with a timing t1 at which an intermediate voltage (Vv in FIG. 24) of three coil drive voltages Vu, Vv and Vw intersects a carrier signal CS, and a timing t2 delayed a predetermined time Δt from the timing t1 and by using the sampling pulses SH.

Although such sampling timings show no problems in the vicinity of the center of the sections 1 through 6 in which the values of Vu, Vv and Vw are respectively spaced away from one another, any two (Vv and Vw in FIG. 24) of the values of Vu, Vv and Vw approximate each other in the neighborhood of the boundary between the sections, and the period in which the DC current can be detected, is short. It is therefore feared that the current of an erroneous coil is detected due to a slight shift in sampling timing. Since the amplitudes of the drive voltages for the respective coils are small in a state of a small number of rotations in which the values of Vu, Vv and Vw are small in particular, the difference between the respective voltage values becomes small so that the detection of each accurate current becomes further difficult.

An object of the present invention is to provide a rotation drive device capable of, even if a motor of such a type that induced voltages cause polarity inversion temporarily every 180 electrical degrees is used, staring up the motor without causing its reverse rotation.

Another object of the present invention is to provide a rotation drive device capable of, in synchronous drive control of a multi-phase DC motor based on a sine wave current drive system, accurately detecting currents flowing through respective coils, and applying control voltages high in accuracy to the respective coils to thereby smoothly rotate the motor.

A further object of the present invention is to provide a magnetic disk system capable of causing currents having accurate sine wave waveforms to flow through coils to thereby allow high-density magnetic storage with less variations in rotation, and having a spindle motor rotated at low noise.

The above, other objects and features of the present invention will become apparent from the description of the present Specification and the accompanying drawings.

Summaries of representative ones of the inventions disclosed in the present application will be described in brief as follows:

In start-up control of a motor in which currents are caused to flow through any two of three phase coils to detect the polarity of a voltage induced in each de-energized phase, thereby determining the corresponding energized phase at start-up thereof, based on the polarity of the detected induced voltage, the levels of induced voltages are detected in addition to the polarity of the induced voltage at the de-energized phase to thereby determine the relationship between the magnitudes thereof, and the energized phase at the start-up is determined based on the relationship of magnitude between the polarity of each induced voltage and the level thereof.

According to the above means, the energized phase at the start-up is determined in consideration of the result of determination of the magnitudes of the levels of the induced voltages as well as the result of detection of the polarities thereof. Therefore, even if a special type of motor wherein induced voltages cause polarity inversion temporarily every 180 electrical degrees is used, the motor can be started up without causing its reverse rotation.

Another invention of the present application provides a rotation drive control device of a multi-phase DC motor wherein a driver for allowing a drive current to flow through each coil is controlled by PWM control signals, and a sine wave-shaped current is caused to flow through each coil to thereby rotatably drive the motor, positive-phase and negative-phase signals are generated as triangular wave carrier signals for generating the PWM control signals, and the PWM control signal related to the corresponding phase coil of the respective phase coils, to which a voltage of an intermediate level is applied by the driver, is generated using a carrier signal opposite in phase to a triangular wave signal used to generate the PWM control signals for other phase coils.

According to the above means, the motor can be driven by sine wave currents without providing de-energized periods. Further, the motor can be rotated at low vibration and low noise. In synchronous drive control of a multi-phase DC motor based on a sine wave current drive system, currents that flow through respective coils are accurately detected, and control voltages high in accuracy are applied to the respective coils to thereby make it possible to smoothly rotate the motor. Further, accurate sine wave current driving is enabled even in a low number-of-rotations state in which voltage values to be applied to the coils for the respective phases approximate each other. Thus, the motor can be rotated at the maximum drive torque even during acceleration immediately following the start-up of the motor. In addition, the start-up time can be shortened as compared with acceleration based on synchronous driving or the like for carrying out the external input of each phase switching timing.

DETAILED DESCRIPTION OF THE PREFERRED EMBODIMENTS

Preferred embodiments of the present invention will hereinafter be explained with reference to the accompanying drawings.

Figure 1:
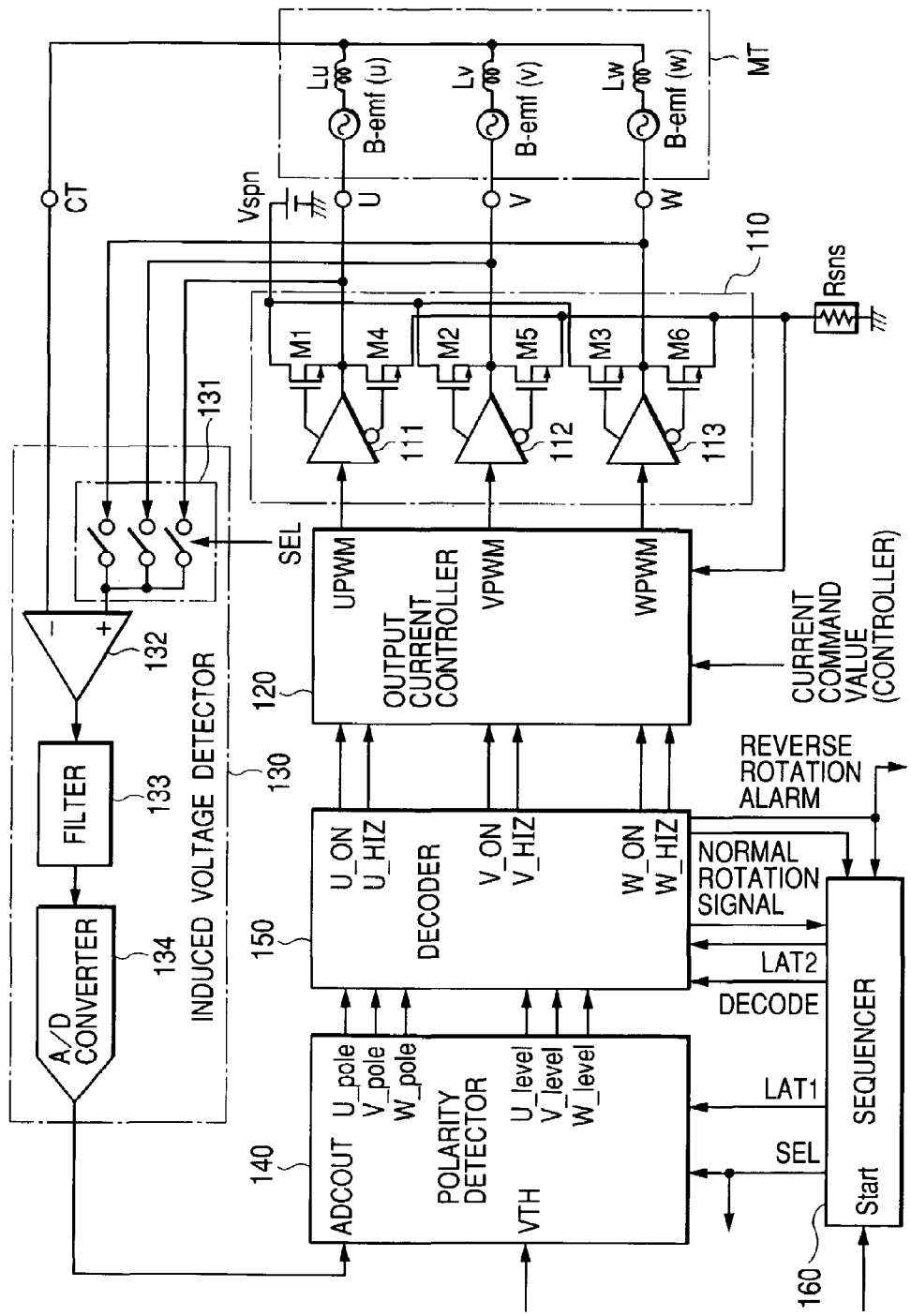
FIG. 1 is a circuit configurational diagram showing schematic configurations of a drive circuit and a start-up control circuit employed in a three-phase DC motor effective if the present invention is applied thereto.

FIG. 1 shows schematic configurations of a drive circuit and a start-up control circuit employed in a three-phase brushless DC motor.

Referring to FIG. 1, Lu, Lv and Lw respectively indicate stator coils of three U, V and W phases of a motor MT, and B-emf(U), B-emf(V) and B-emf(W) respectively indicate back electromotive voltages of the phase coils Lu, Lv and Lw as voltage sources. Reference numeral 110 designates an output driver for applying voltages to terminals of the respective coils to thereby cause drive currents to flow, M1 through M3 respectively indicate output transistors on the high potential side, which allow currents to flow into the coils of the respective phases, M4 through M6 respectively indicate output transistors on the low potential side, which pull in currents from the coils of the respective phases, and reference numerals 111 through 113 respectively indicate printer drivers which apply gate voltages to the output transistors M1 through M6 to control the drive currents of the coils. Source terminals of the output transistors M4 through M6 on the low potential side are connected in common and connected to a ground potential point through a current sense resistor Rsns. They are configured such that a DC current flowing from a power supply via the motor is caused to flow into the sense resistor Rsns.

Reference numeral 120 indicates an output current controller which generates PWM signals for controlling output currents and supplies them to the output driver 110. A voltage corresponding to the DC current detected by the current sense resistor Rsns is fed back to the output current controller 120, which generates and outputs pulse signals UPWM, VPWM and WPWM for effecting PWM control on the output driver 110 in such a way as to coincide with each of current command values supplied from an unillustrated controller.

Reference numeral 130 indicates an induced voltage detector which detects a voltage induced in the coil of the de-energized phase according to the currents having flown through any two of the phase coils. The induced voltage detector 130 comprises a selector circuit 131 made up of three switches for selecting the coil which attempts to detect the induced voltage, a differential amplifier 132 which amplifies and outputs the potential difference between the voltage applied to one terminal of the coil selected by the selector circuit and the voltage of a center tap CT to which one ends of the respective coils are connected in common, a filter 133 which cuts noise contained in the output of the differential amplifier, and an A/D converter 134 which AD-converts a voltage outputted from the differential amplifier 133 into a digital signal.

Reference numeral 140 indicates a polarity detector which determines the polarity of the induced voltage detected by the induced voltage detector 130 and makes a decision as to whether the detected induced voltage is larger or smaller than a predetermined level, reference numeral 150 indicates a decoder or decoder section which decodes the output of the polarity detector 140 to make a decision as to the current-carrying phase and supplies a signal indicative of the energized phase to the output current controller 120, and reference numeral 160 indicates a sequencer which controls the whole controller in accordance with a predetermined control procedure. The sequencer 160 is supplied with a signal indicative of the result of determination and normal rotation, and a signal indicative of reverse rotation from the decoder 150, and generates and outputs signals for controlling the respective parts according to these signals.

Figure 2A:
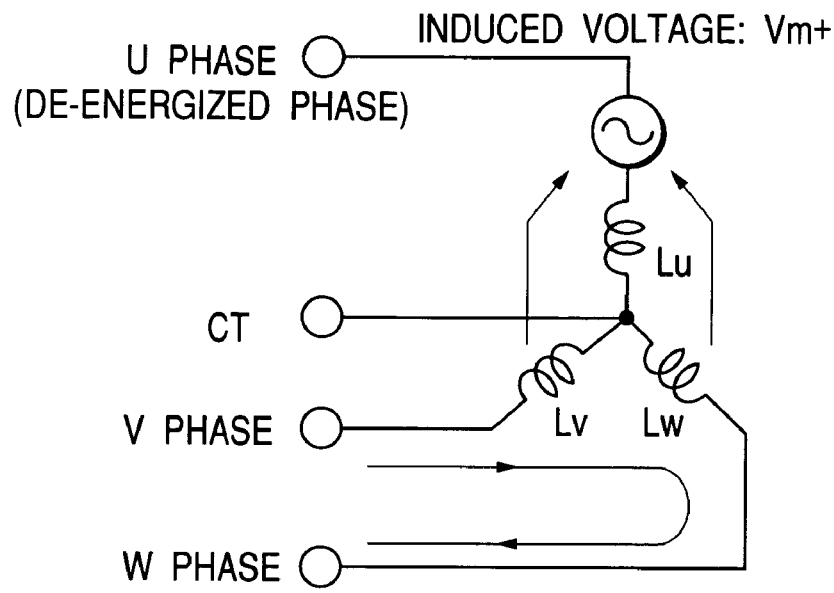
FIGS. 2(*a*) and 2(*b*) are explanatory diagrams illustrating an energizing method for detecting the position of a rotor in the start-up control circuit according to the embodiment, and a method for detecting an induced voltage of a de-energized phase.
Figure 2B:
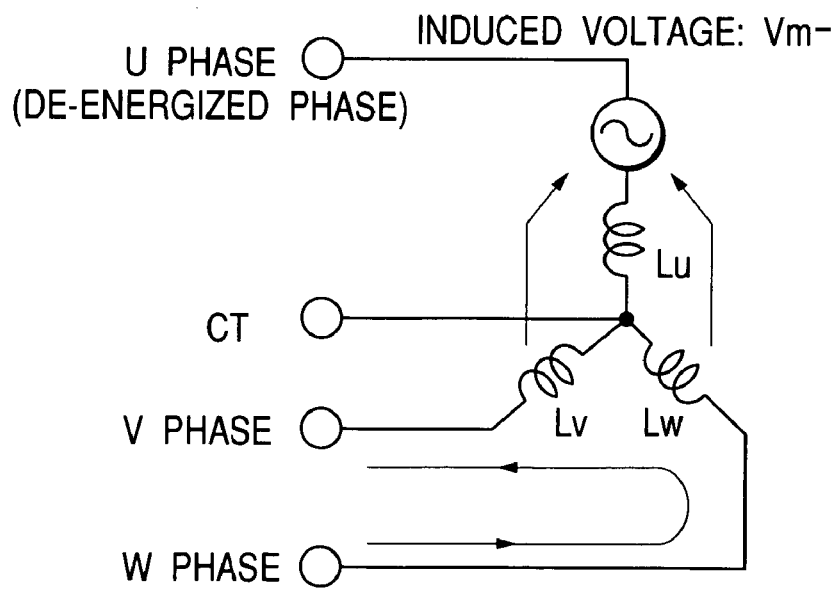

A description will next be made of how to determine the energized phase at motor startup in the start-up control circuit according to the present embodiment. In the present embodiment, as shown in FIG. 2(*a*) by way of example, such a small current that a rotor does not responds, is caused to flow from a V-phase coil Lv to a W-phase coil Lw. At this time, an induced voltage Vm+ developed in a U-phase coil Lu is detected. Subsequently, as shown in FIG. 2(*b*), a current is caused to flow from a W-phase coil Lw to a V-phase coil Lv. At this time, an induced voltage Vm− developed in a U-phase coil Lu is detected. Then the sum of these is calculated and it is determined whether the value thereof is "positive" or "negative".

Next, a current is caused to flow from the U-phase coil Lu to the V-phase coil Lv. At this time, an induced voltage Vm+ developed in the W-phase coil Lw is detected. Subsequently, a current is caused to flow from the V-phase coil Lv to the U-phase coil Lu. At this time, an induced voltage Vm− developed in the W-phase coil Lw is detected. Then the sum of these is calculated and a decision as to whether the value thereof is "positive" or "negative" is made. Further, a current is caused to flow from the W-phase coil Lw to the U-phase coil Lu and at this time an induced voltage Vm+ developed in the V-phase coil Lv is detected. Subsequently, a current is caused to flow from the U-phase coil Lu to the W-phase coil Lw and at this time an induced voltage Vm− developed in the V-phase coil Lv is detected. Then the sum of these is calculated and a decision as to whether the value thereof is "positive" or "negative" is made.

Figure 3:
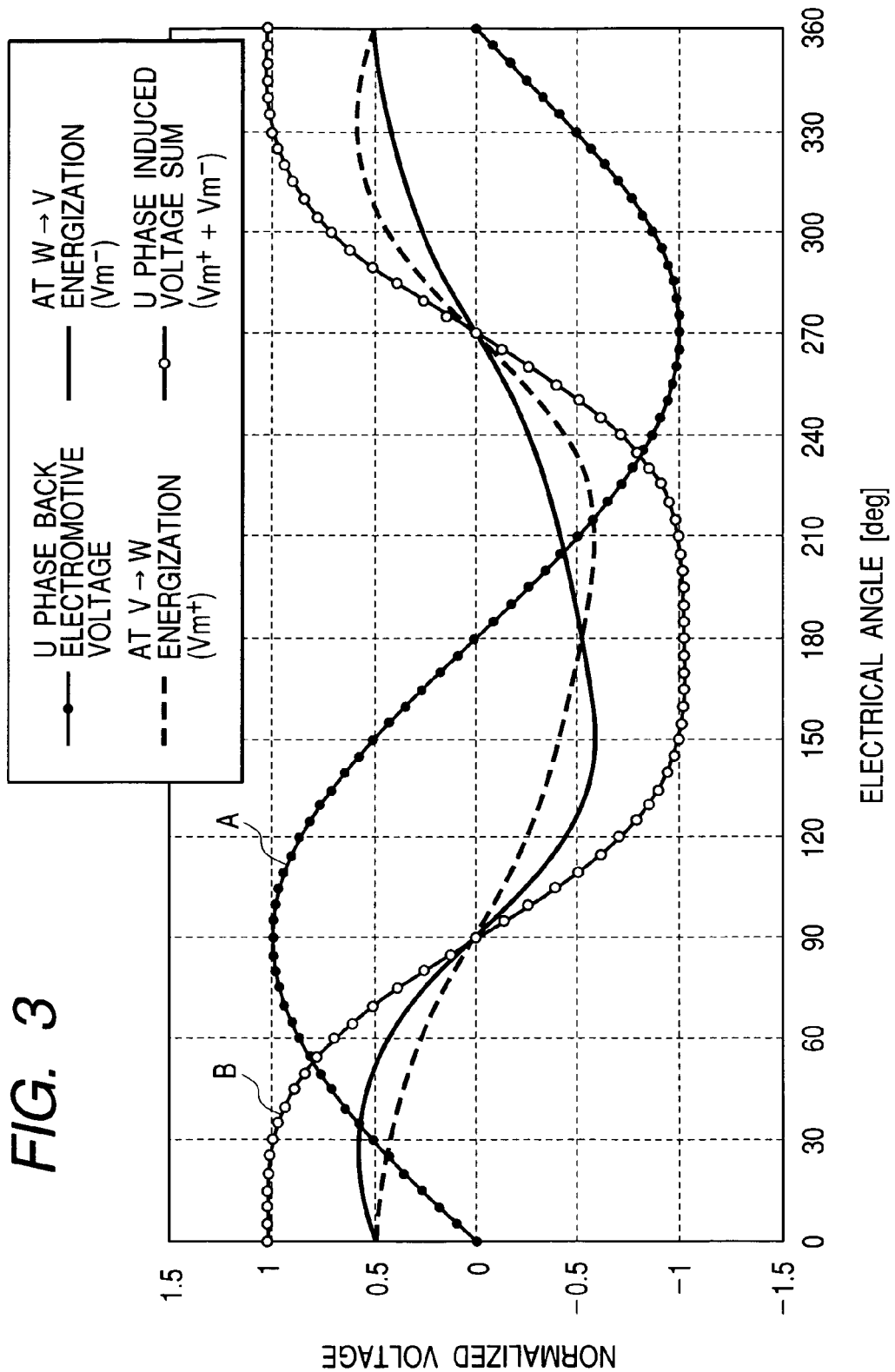
FIG. 3 is a waveform diagram showing the relationship between voltages induced in de-energized phases and the phase of a back electromotive voltage in a general three-phase DC motor.
Figure 4:
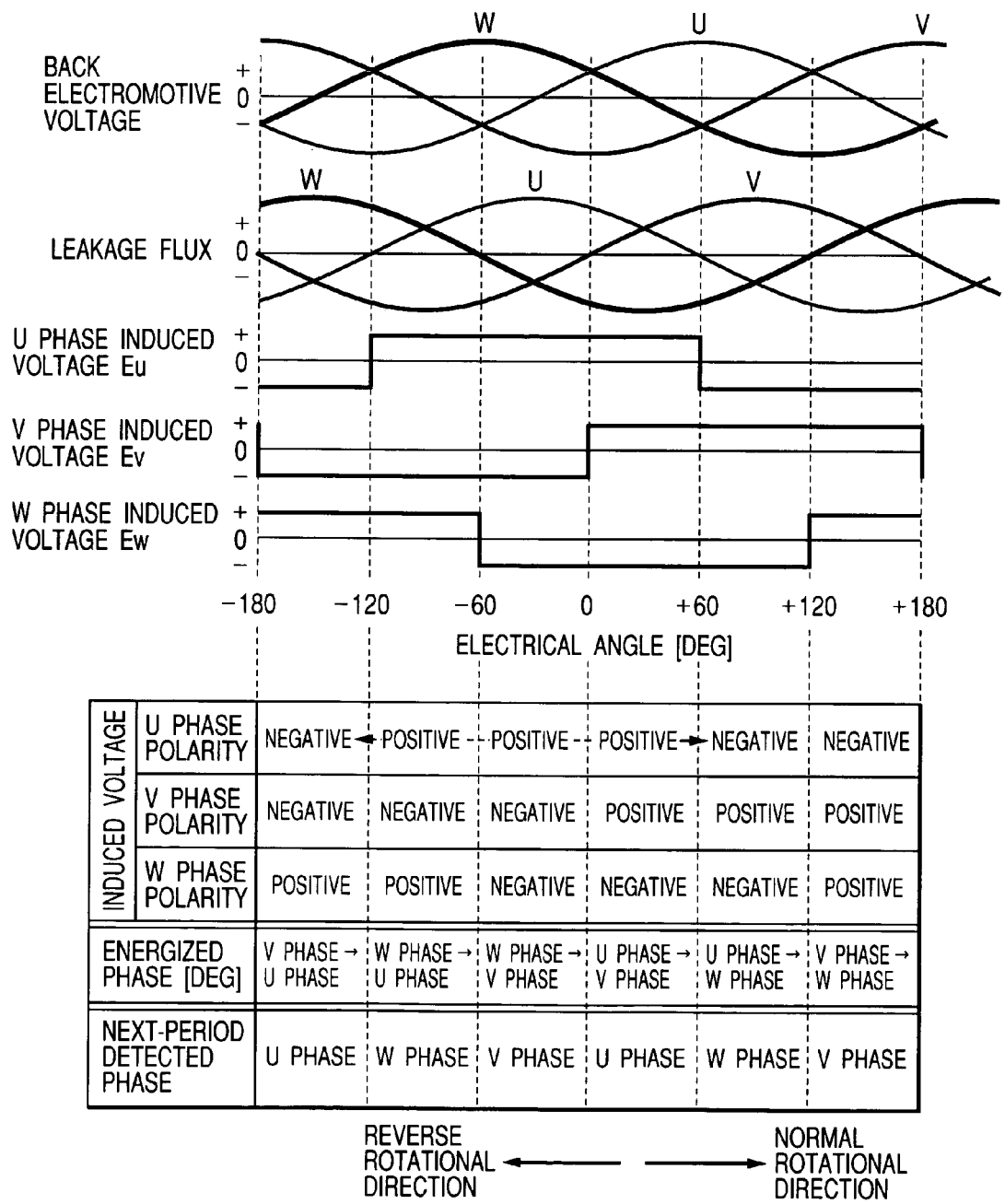
FIG. 4 is a waveform diagram depicting the relationship between polarities of induced voltages and phases of back electromotive voltages in the general three-phase DC motor.

A de-energized phase induced voltage of a general three-phase DC motor, which has currently been provided, results in a waveform B whose phase is about 90 electrical degrees leading with respect to a waveform A of a back electromotive voltage as shown in FIG. 3. When a motor in which an induced voltage has such a characteristic as shown in FIG. 3, is started up, the polarities of induced voltages of the respective phases are detected as shown in FIG. 4. When the polarities of the induced voltages of the U, V and W phases are given as "negative", "negative" and "positive", the energized phase is determined as V phase→U phase, when the polarities of the induced voltages of the U, V and W phases are given as "positive", "negative" and "positive", the energized phase is determined as W phase→U phase, when the polarities of the induced voltages of the U, V and W phases are given as "positive", "negative" and "negative", the energized phase is determined as W phase→V phase, when the polarities of the induced voltages of the U, V and W phases are given as "positive", "positive" and "negative", the energized phase is determined as U phase→V phase, when the polarities of the induced voltages of the U, V and W phases are given as "negative", "positive" and "negative", the energized phase is determined as U phase→W phase, and when the polarities of the induced voltages of the U, V and W phases are given as "negative", "positive" and "positive", the energized phase is determined as V phase→W phase, thereby allowing currents to flow therethrough. By controlling the output driver in this way, the motor can be started up. Such a start-up method is equivalent to a start-up method disclosed in Japanese Unexamined Patent Publication No. Hei 13(2001)-275387.

Figure 6:
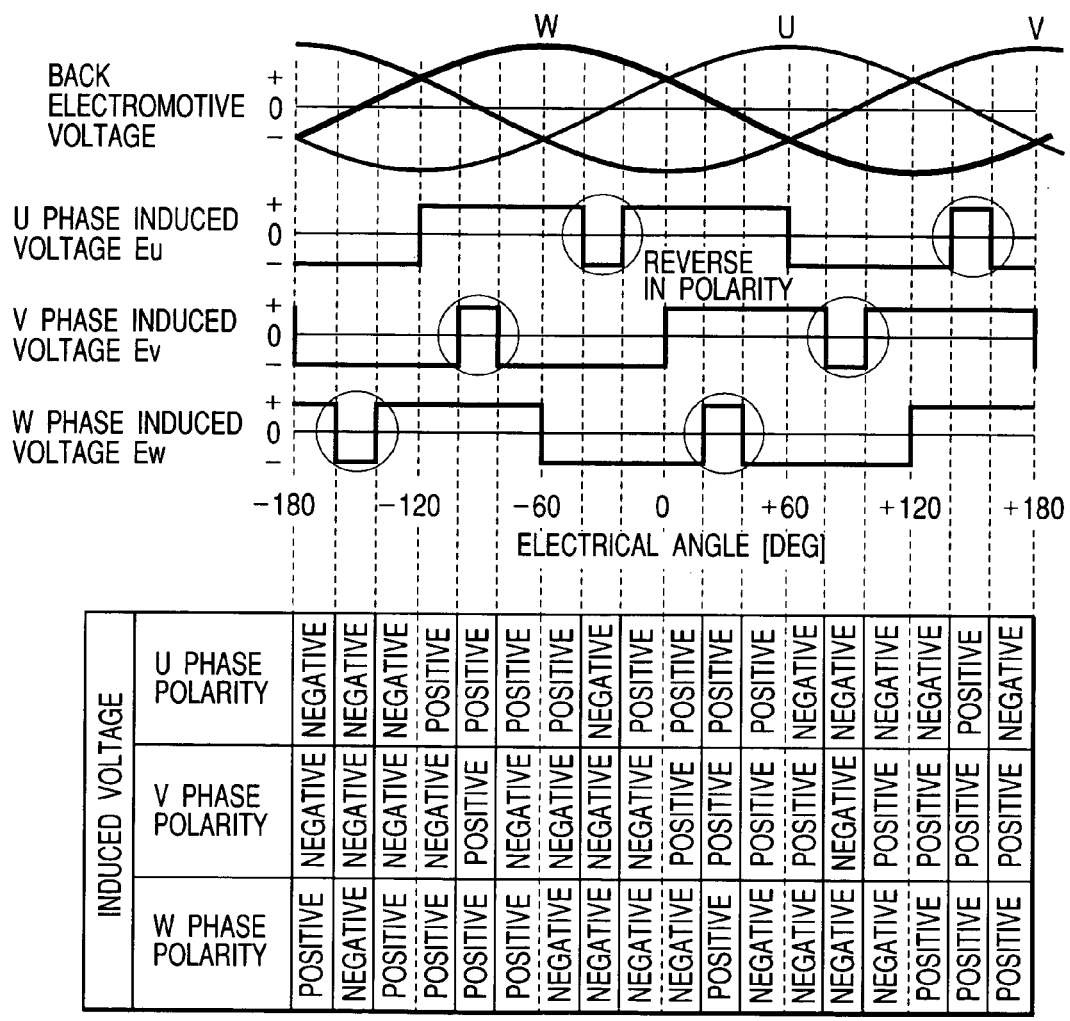
FIG. 6 is a waveform diagram depicting the relationship between polarities of induced voltages and phases of back electromotive voltages in the special three-phase DC motor.

Meanwhile, various three-phase DC motors have recently been provided to reduce noise and vibrations. It was found that such a motor that the point at which the polarity of an induced voltage was changed with respect to the phase of a back electromotive voltage, was identical to one shown in FIG. 3 (electrical angle: 90°) but the polarity of the induced voltage was temporarily inverted at the positions of phases 0° and 180° of the back electromotive voltage, existed in these. The polarities of the induced voltages at the respective phase coils of the motor having such a characteristic are represented like Table shown below in FIG. 6. As is apparent by comparison with Table shown in FIG. 4, portions marked with meshes in Table of FIG. 6 are all represented as "negative" or "positive" in polarity and hence differ in polarity determination result. Therefore, it happens that the start-up method disclosed in Japanese Unexamined Patent Publication No. Hei 13(2001)-275387 is not able to rotate the motor in the proper direction.

Figure 5:
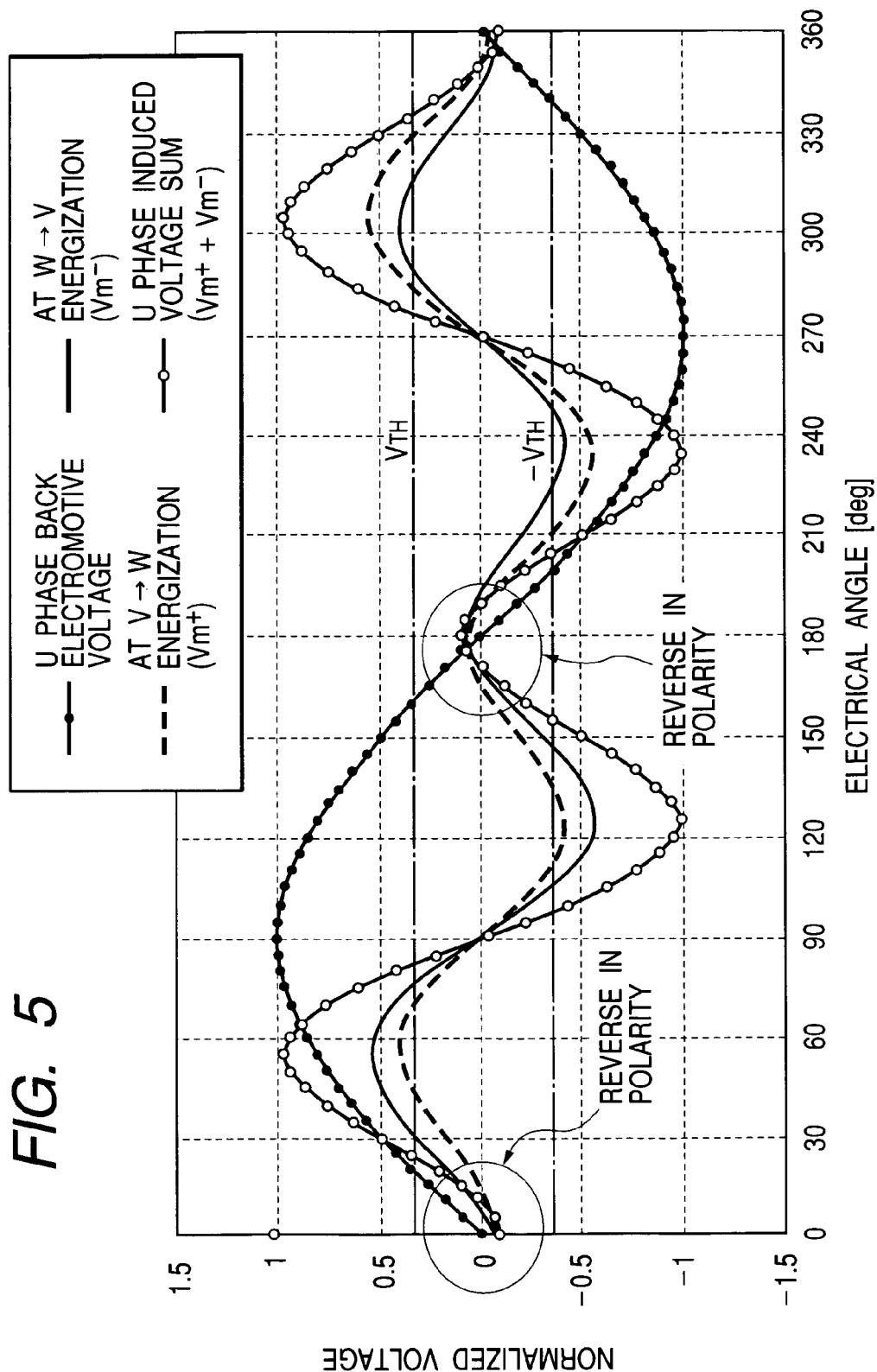
FIG. 5 is a waveform diagram showing voltages induced in de-energized phases and the phase of a back electromotive voltage in a special three-phase DC motor.

In the start-up control circuit according to the present embodiment, the level of each detected induced voltage is determined based on such a reference level ±VTH as indicated by a broken line in FIG. 5 as well as the polarity of each detected induced voltage. Thus, even if such a motor that the induced voltage has such a characteristic as shown in FIG. 5 is used, it can reliably be started up.

Figure 7:
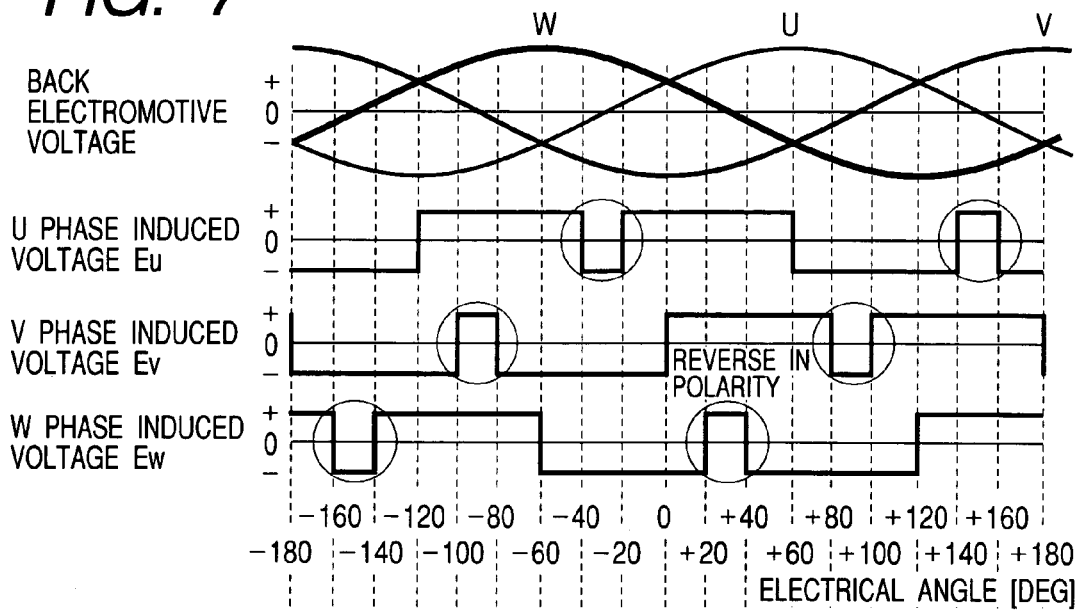
FIG. 7 is a waveform diagram showing the relationship among polarities of induced voltages, magnitudes of their levels, and phases of back electromotive voltages in the special three-phase DC motor.

FIG. 7 shows polarities of induced voltages, level determination results, and energized phases in the start-up control circuit according to the present embodiment. Judging from FIG. 7, all of the polarities of the induced voltages of the U, V and W phases are represented as "negative" in ranges of −160 to −140 electrical degrees, −40 to −20 electrical degrees and +80 to +100 electrical degrees. Although whether the rotor is placed in any position cannot be identified by the polarity alone, the levels of the induced voltages of the U, V and W phases are respectively different as in the case of "high", "high" and "low" in the range of −160 to −140 electrical degrees, "low", "high" and "high" in the range of −40 to −20 electrical degrees, and "high", "low" and "high" in the range of +80 to +100 electrical degrees. It is understood that the energized phases can be determined if reference is made even to the determination results of levels.

The start-up control circuit according to the present embodiment is configured in such a manner that the polarity detector 140, the decoder 150 and the sequencer 160 determine the energized phases based on the polarities of the above-described induced voltages and level determination results. The configurations and operations of the polarity detector 140 and decoder 150 will be explained below using FIGS. 8 and 9, and the start-up control procedure by the sequencer 160 will be described below using a flowchart of FIG. 10.

Figure 8:
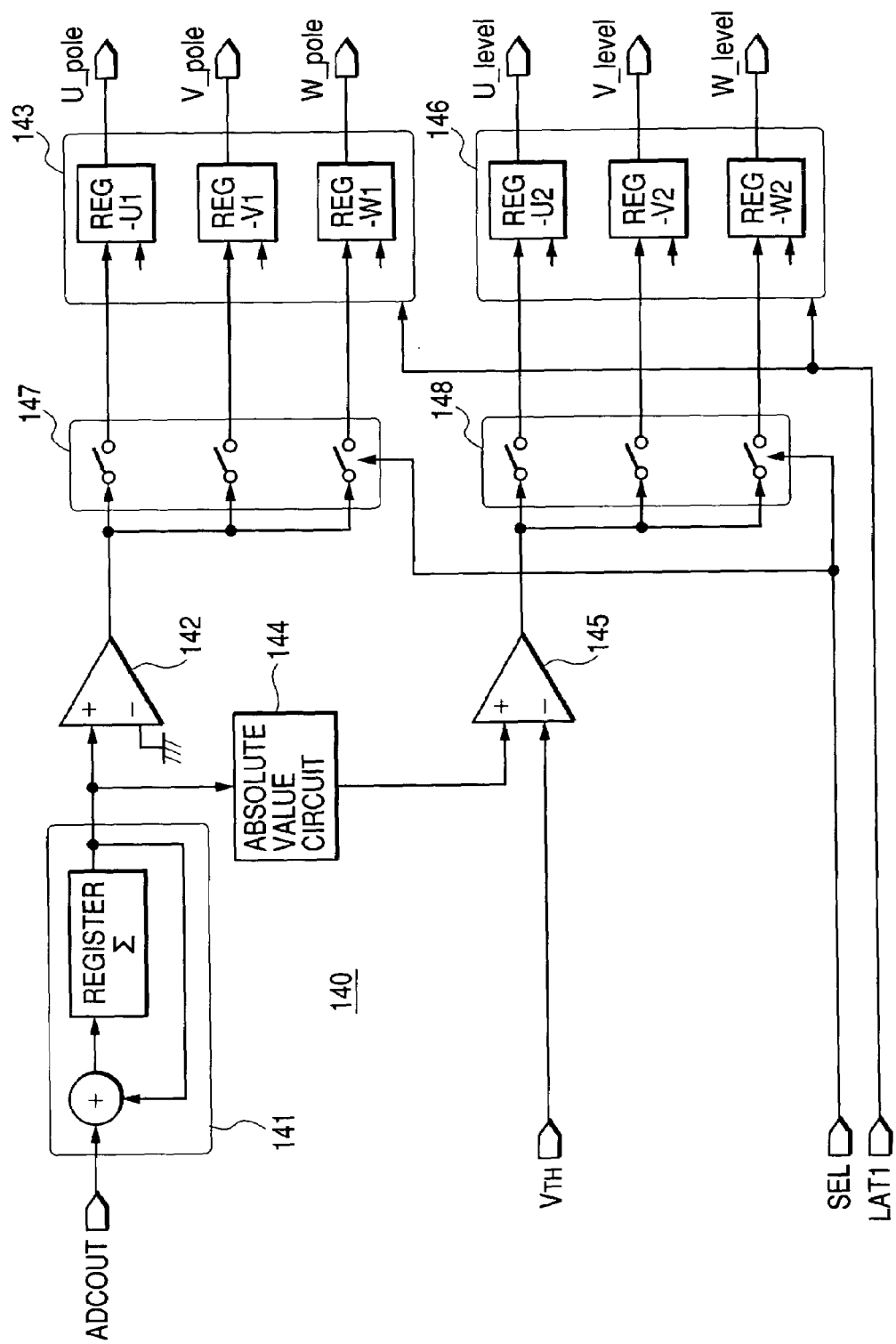
FIG. 8 is a block diagram illustrating a configurational example of a polarity detector of a motor drive control circuit employed in the embodiment.

FIG. 8 shows a configurational example of the polarity detector 140. The polarity detector 140 employed in the present embodiment includes an integrating register 141 which accumulates and adds induced voltage values detected by the induced voltage detector 130 and converted into digital values by the AD converter 134, a polarity determining comparator 142 which determines the polarity of each detected induced voltage, a polarity register 143 which retains the result of determination by the polarity determining comparator 142, an absolute value circuit 144 which converts the detected induced voltage into an absolute value, a level determining comparator 145 which compares the converted absolute value and the reference level VTH and determines whether the detected induced voltage reaches a predetermined level or more, a level determining register 146 which retains the result of determination by the level determining comparator 145, a selector 147 provided between the polarity determining comparator 142 and the polarity register 143, and a selector 148 provided between the level determining comparator 145 and the level determining register 146.

The polarity register 143 and the level determining register 146 respectively comprise three registers REG-U, REG-V and REG-W which retain determination results corresponding to the respective phase coils U, V and W. The polarity register 143 and the level determining register 146 respectively latch the determination results in accordance with a latch command signal LT1 supplied from the sequencer 160.

The selector 147 and the selector 148 are controlled by a select signal SEL supplied to the selector 131 of the induced voltage detector 130. Results about the phases, which are detected by the induced voltage detector 130, are stored in their corresponding registers. Signals Upole, Vpole and Wpole each indicative of the polarity of the induced voltage of each phase are outputted from the polarity register 143 to the decoder 150, and signals Ulevel, Vlevel and Wlevel each indicative of whether the level of the induced voltage of each phase is higher or lower than the reference level VTH, are outputted from the level determining register 146 to the decoder 150.

Figure 9:
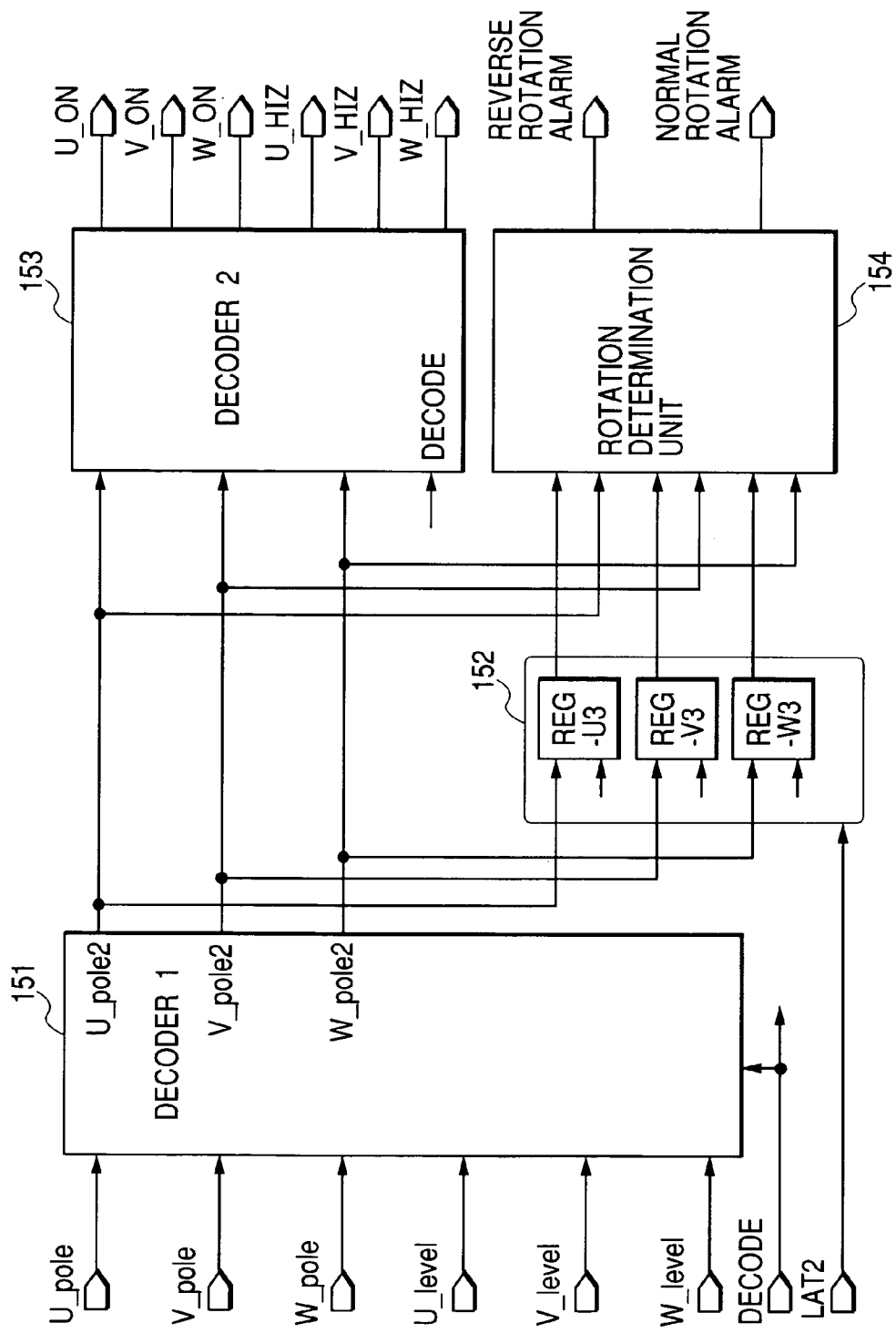
FIG. 9 is a block diagram showing a configurational example of a decoder of the motor drive control circuit employed in the embodiment.

FIG. 9 shows a configurational example of the decoder 150. The decoder 150 employed in the present embodiment includes a first decoder 151 which decodes the signals Upole, Vpole and Wpole each indicative of the polarity, which are outputted from the polarity detector 140, and the signals Ulevel, Vlevel and Wlevel each indicative of the magnitude of the level of the induced voltage to thereby generate and output signals Upole2, Vpole2 and Wpole2 respectively indicative of the polarities (positive and negative) of the respective phases such as shown in the third column in association with states (positive and negative determination and high and low level determination) shown in two columns from the top of Table shown in FIG. 7, a register 152 which retains or holds results outputted from the first decoder 151, a second decoder 153 which generates and outputs signals UON, VON, WON, UHIZ, VHIZ and WHIZ for respectively driving and controlling the coils of the respective phases in accordance with energizing directions shown in the bottom column of Table in FIG. 7, based on the output signals Upole2, Vpole2 and Wpole2 of the first decoder 151, and a rotation determination unit 154 which determines whether the rotor is normally rotating or reversely rotating, based on the output signals Upole2, Vpole2 and Wpole2 of the first decoder 151 and the immediately preceding output signals Upole2, Vpole2 and Wpole2 of the first decoder 151, which have been retained in the register 152. The register 152 latches the result of decoding in accordance with a latch command signal LAT2 outputted from the sequencer 160.

When it does not happen that the three signals Upole, Vpole and Wpole each indicative of the polarity result in the same state ("positive", "positive" and "positive" or "negative", "negative" and "negative") as shown in Table of FIG. 7, the first decoder 151 is configured so as to generate the output signals Upole2, Vpole2 and Upole2, based on only the determined results of polarities without referring to the determined results of levels. Thus, it is possible to properly start up not only a special motor which produces temporary polarity reversal but also a general motor which produces no temporary polarity reversal.

The signals UON, VON and WON outputted from the second decoder 153 means that when they are high in level, the voltage Vspn is applied to the corresponding coil terminals for phases to allow currents to flow therein, whereas when they are low in level, the corresponding coil terminals for phases are connected to the ground point to pull in currents. The signals UHIZ, VHIZ and WHIZ means that when they are high in level, the corresponding coil terminals for phases are brought to high impedance, i.e., de-energized phases. The rotation determination unit 154 outputs a signal indicating that the rotor is being normally rotated when it is determined that the rotor has been normally rotated, and outputs a reverse rotation alarm signal when it is determined that the rotor has been reversely rotated. The normal rotation signal is supplied to the sequencer 160, and the reverse rotation signal is supplied to the sequencer 160 and an out-of-drawing controller.

Figure 10:
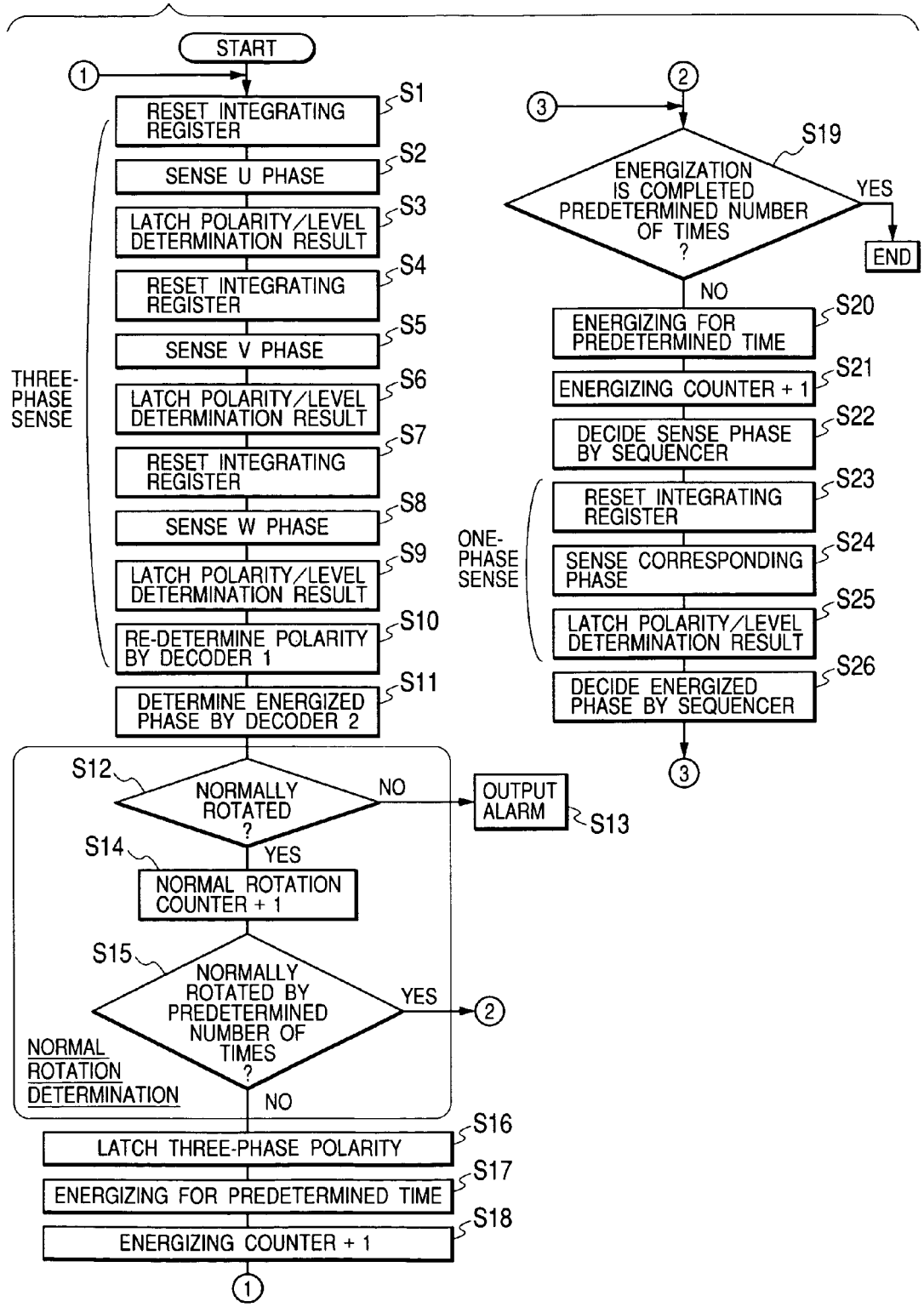
FIG. 10 is a flowchart depicting one example of a start-up control procedure by a sequencer of the motor drive control circuit employed in the embodiment.

The start-up control procedure by the sequencer 160 will next be described using the flowchart of FIG. 10.

When the sequencer 160 starts start-up control, it resets the integrating register 141 that accumulates and retains the AD conversion results, which is provided in the polarity detector 140 shown in FIG. 8 (Step S1). Afterwards, the sequencer 160 causes such a current having a short pulse that the rotor does not responds, to flow from the V-phase coil to the W-phase coil and performs the detection of an induced voltage appearing at the coil for the "U-phase" due to a mutual-induction phenomenon at this time by a predetermined number of times, and then causes the integrating register 141 to accumulate the result obtained by converting the detected inducted voltage by the AD converter 134. Further, the sequencer 160 changes the direction of the current and repeats the same operation, and then determines the polarity and level of the induced voltage at the U phase, based on the value of the integrating register and causes the registers 143 and 146 to latch the result thereof (Steps S2 and S3).

Next, the sequencer 160 resets the integrating register 141 again and causes such a current having a short pulse that the rotor does not responds, to flow from the U-phase coil to the W-phase coil and then performs the detection of an induced voltage appearing at the coil for the "V-phase" this time by a predetermined number of times, and causes the integrating register 141 to accumulate the result obtained by converting the detected inducted voltage by the AD converter 134. Further, the sequencer 160 changes the direction of the current and repeats the same operation, and then determines the polarity and level of the induced voltage at the V phase, based on the value of the integrating register and causes the registers 143 and 146 to latch the result thereof (Steps S4 through S6).

Afterwards, the sequencer 160 further resets the integrating register 141 and causes such a current having a short pulse that the rotor does not responds, to flow from the U-phase coil to the V-phase coil and then performs the detection of an induced voltage appearing at the coil for the "W-phase" this time by a predetermined number of times, and causes the integrating register 141 to accumulate the result obtained by converting the detected inducted voltage by the AD converter 134. Further, the sequencer 160 changes the direction of the current and repeats the same operation, and then determines the polarity and level of the induced voltage at the W phase, based on the value of the integrating register and causes the registers 143 and 146 to latch the result thereof (Steps S7 through S9).

Subsequently, the first decoder 151 of the decoder 150 decodes the output signals of the registers 143 and 146 to determine the polarities of the induced voltages for the respective phases. Further, the sequencer 160 causes the register 152 to latch results of polarity determination and thereafter allows the second decoder 153 to decide the energized phases (energizing directions) (Steps S10 and S11). Then the rotation determination unit 154 of the decoder 150 compares the present polarity and the previous polarity and determines whether the rotor is being normally rotated (Step S12).

If attention is given to 0 to 60 electrical degrees shown in Table of FIG. 4 by way of example, then the result of polarity detection of three phases results in "positive", "positive" and "negative". Thus, the polarities of the three phases to be detected next should be "positive", "positive" and "negative" or "negative", "positive" and "negative". If the result of polarity detection of the three phases is now represented as "positive", "negative" and "negative", it can then be determined that the rotor has been reversely rotated. Other electrical angles are also similar. If it is determined that the rotor has been reversely rotated, then an alarm signal is outputted. If it is judged that the rotor has been normally rotated, then a normal rotation counter is incremented by (+1) (Steps S13 and S14). Incidentally, when the reverse rotation alarm signal is outputted, the start-up control is executed again from Step S1 after the rotor has perfectly stopped after a while.

After the proper time, it is determined by reference to the value of the normal rotation counter whether the rotor has been rotated a predetermined number of times or a predetermined electrical degrees or more. If it is found not to be rotated, then the sequencer 160 causes the register 152 to latch the detected polarities of induced voltages of the three phases (Step S15 and S16). Then the energized phase established in Step S11 is energized for a relatively short predetermined time of period, and an energizing counter is incremented and the sequencer returns to Step S1 in accordance with a symbol ① (Steps S17 and S18). Thereafter, the sequencer 160 repeats the above operation. If it is determined that when the sequencer 160 reaches Step S15 again, the rotor has been rotated a predetermined number of times or a predetermined electrical degrees (e.g., 360°) or more, then the sequencer 160 proceeds to Step S19 according to symbol ②.

At Step S19, the sequencer 160 judges by reference to the value of the energizing counter whether a predetermined number of energization have been completed. When it is found that the predetermined number of energization have not yet completed, the energization is performed for a relatively short predetermined time of period, and the energizing counter is incremented (Steps S20 and S21). Then the sequencer 160 determines a sense phase for next detecting an induced voltage, based on the result of determination retained in the register of the decoder 150 and outputs a select signal SEL corresponding to it (Step S22).

In the present embodiment, as shown in Table of FIG. 4, the phase to be detected next is decided corresponding to each energized phase. When the energized phase is given as "U phase→V phase", for example, the phase to be detected next is taken as the U phase. This is because if the rotor has been normally rotated, then the phase that changes in polarity next, is uniquely determined, and it has been determined that the rotor has already been normally rotated upon execution of this Step S22.

Thus, as distinct from at start-up, the energized phase can subsequently be decided by sensing of one phase alone. According to the flow of FIG. 10, if the sense phase has been determined in Step S22, then the sequencer 160 resets the integrating register 141 in the polarity detector 140 in next Step S23. Thereafter, the sequencer 160 performs detection of the polarity of an induced voltage with respect to the determined phase, and determination of its level, and allows the registers 143 and 146 to latch the result of determination (Step S24 and S25). Owing to the switching to the detection of one phase alone in this way, the time necessary for the detection of each energized phase can be reduced, and the energizing time for acceleration can be made long correspondingly. It is therefore possible to shorten the time up to steady rotation.

Thereafter, the sequencer 160 decides the following energized phase from the polarity and level determination result detected in Step S26 and returns to Step S19 where the above operation is repeated. If the result of determination latched in Step S25 is identical to the previous one here, then the same phase (e.g., U phase) as previous is selected as the sense phase in Step S22, and energization (e.g., U phase→V phase) is effected on the same phase. If the result of determination latched in Step S25 is different from the previous one, then the phase (e.g., W phase) to be expected next is selected as the sense phase in Step S22. Then, energization (e.g., U phase→W phase) is effected on the phase corresponding to it in Step S20. Thus, the rotational speed of the rotor is gradually accelerated. When it is judged in Step S19 that the energization has been completed a predetermined number of times, the sequencer 160 terminates the start-up control and proceeds to the normal drive control. In the present embodiment, when the predetermined number of energization are completed, the value of the predetermined number of times is set so as to reach about 5% or more of the number of rotations at the steady state.

Incidentally, in the present embodiment, the energized phase is decided with being added with the level determination result of each induced voltage where the energized phase cannot be determined by only the polarity detection result of each induced voltage. However, it may be feasible to omit the level determination of the induced voltage, ignore the detection result of the remaining one phase when the detection results of the two phases, of the induced voltage detection results of the three phases are found to be expected results, and determine the phase coil through which the current is caused to flow to rotate the rotor, and the direction of energization.

As is understood by reference to Table of FIG. 7 by way of example, the polarities of the induced voltages at the U, V and W phases are all "negative" in the ranges of −160 to −140 electrical degrees, −40 to −20 electrical degrees and +80 to +100 electrical degrees, and whether the rotor is placed in any position cannot be identified by polarity alone. However, if when all are "negative" or "positive" upon the first determination, the rotor is simulated as being placed in any of positions, whereby the energized phase is determined. Then if the rotor is slightly moved in this condition, then the rotor is moved to a properly judgeable position (position where only one of the three phases differs in polarity). Thus, when the current is caused to flow toward the proper phase and direction from this state, the rotor can be rotated in the proper direction where the detected results of two phases are expected results even if the result of detection of the remaining one phase is ignored.

Figure 11:
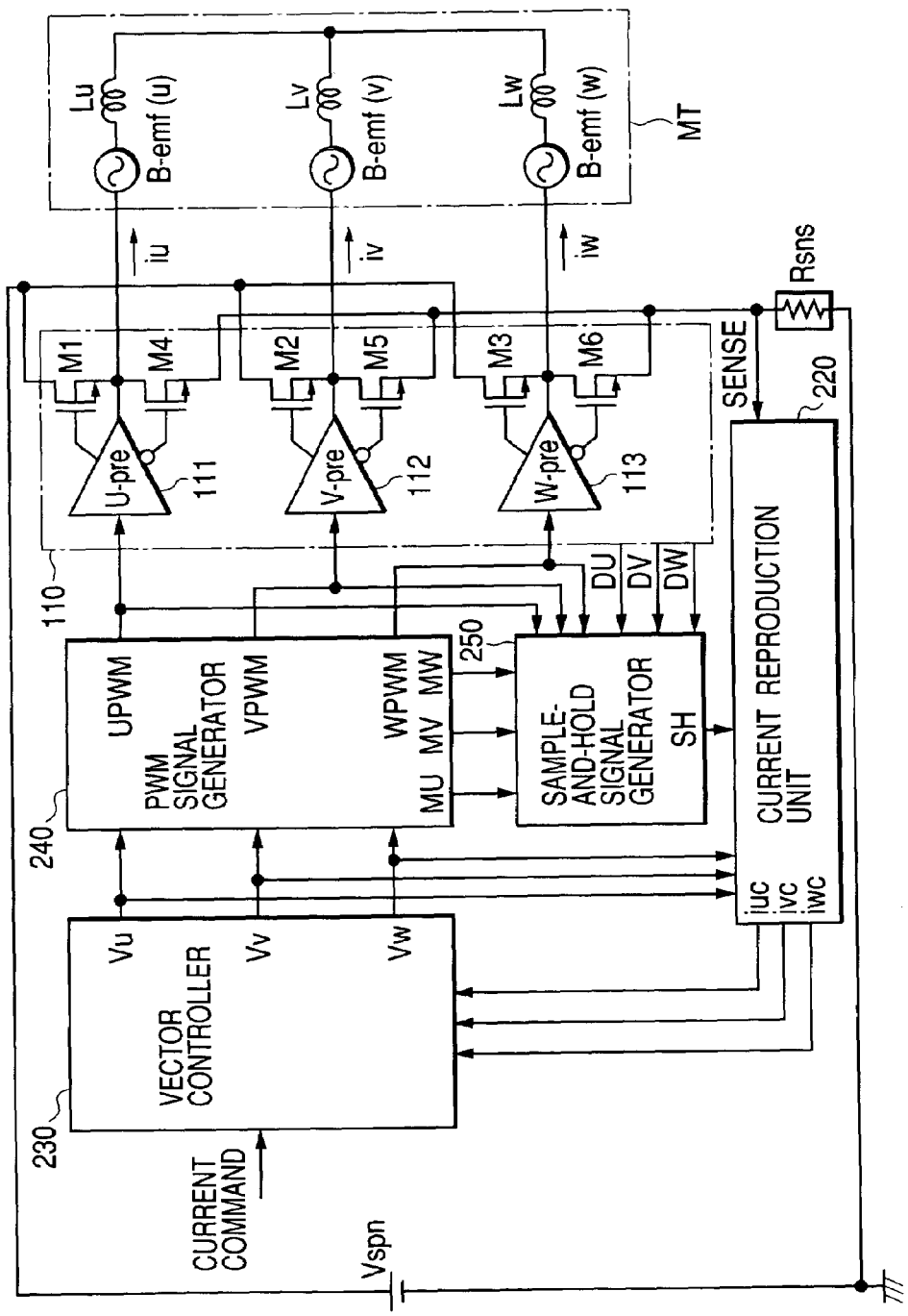
FIG. 11 is a circuit configuration diagram showing a schematic configuration of a drive control circuit for performing post-startup drive control of a three-phase DC motor effective if the present invention is applied.

FIG. 11 shows a schematic configuration of a control circuit which performs drive control at a steady operation of a three-phase DC motor. An output driver 110 is a circuit identical to the output driver 110 shown in FIG. 1. When the motor reaches a predetermined number of rotations or more by the start-up control circuit shown in FIG. 1, control pulses UPWM, VPWM and WPWM outputted from the control circuit of FIG. 11 are supplied to the output driver 110 so that sine wave drive currents flow into coils to thereby drive the motor.

The control circuit shown in FIG. 11 comprises a current reproduction unit 220 which reproduces the currents that flow through the respective coils, based on voltages each converted by a current sense resistor Rsns connected to common source terminals of output transistors M4 through M6 on the low potential side of the output driver 110, a vector controller 230 which generates sine wave-shaped voltage values Vu, Vv and Vw applied to the coils for respective phases, based on a current command value supplied from an unillustrated controller and the currents reproduced by the current reproduction unit 220, a PWM signal generator 240 which generates pulse signals UPWM, VPWM and WPWM for PWM (Pulse-Width Modulation)-controlling drivers for the respective phases by the voltage values Vu, Vv and Vw and a signal ω indicative of the number of rotations, which are generated by the vector controller 230, and supplies them to the pre-drivers 111 through 113, and a sample-and-hold signal generator 250 which generates a sample-and-hold signal for each coil current value at the current reproduction unit 220, based on MU, MV and MW indicative of phases of intermediate potentials of the voltage values Vu, Vv and Vw, and delay signals DU, DV and DW sent from the output driver 110, which are obtained by suitably delaying the UPWM, VPWM and WPWM.

The vector controller 230 detects the differences between the currents flowing through the coils, which are detected by the current reproduction unit 220, and the current command value supplied from the controller (CPU), and generates the voltage values Vu, Vv and Vw so that the differences reach "0". The PWM signal generator 240 generates the PWM signals for driving the output transistors to thereby control output currents caused to flow through the coils. When the detected currents are smaller than the current command value, for example, the amplitudes of the voltage values Vu, Vv and Vw become large so that the PWM signals are rendered large in duty, whereby more currents are controlled so as to flow through the coils. When the detected currents are larger than the current command value, the amplitudes of the voltage values Vu, Vv and Vw become small so that the PWM signals are rendered small in duty, whereby the currents caused to flow through the coils are controlled so as to decrease.

Incidentally, the PWM signals are generated so as to consist of plural (e.g., 48) pulses in the range of 360 electrical degrees. That is, the output transistors are on/off-controlled 48 times by the 48 pulses formed while the rotor is being rotated throughout electrical degrees equivalent to 360° so that the widths of the 48 pulses change in turn according to the voltage values Vu, Vv and Vw generated in sine-wave form, whereby their sine-wave amplitudes are controlled.

Figure 12:
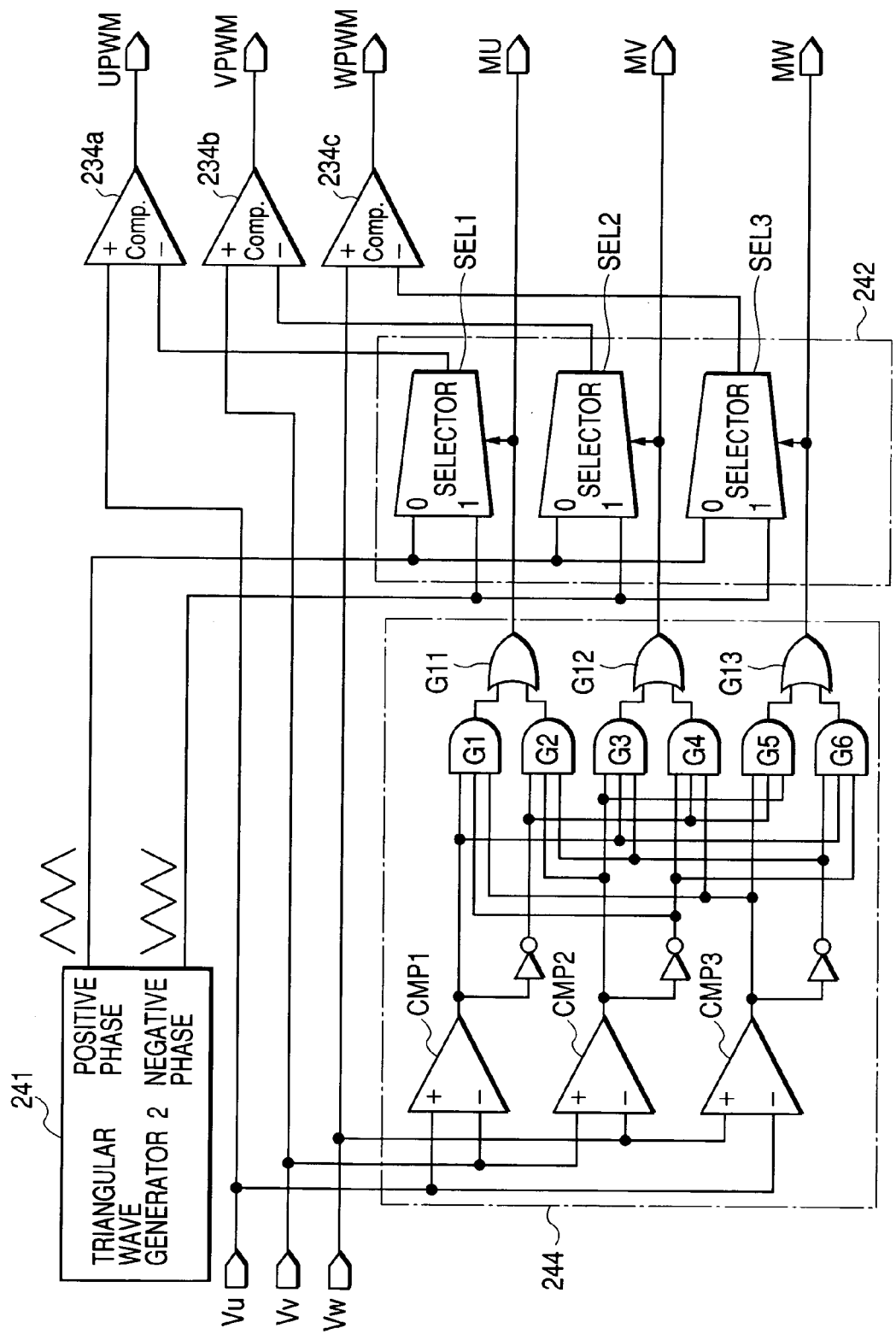
FIG. 12 is a block diagram illustrating a configurational example of a PWM signal generator in the motor drive control circuit shown in FIG. 11.

A configurational example of the PWM signal generator 240 is shown in FIG. 12.

The PWM signal generator 240 employed in the present embodiment comprises a triangular wave generator 241 which generates positive-phase and negative-phase or antiphase triangular wave carrier signals whose phases are displaced 180° with respect to each other, in accordance with the signal ω indicative of the rotation of the motor, which is supplied from the vector controller 230, a carrier selector circuit 242 comprising selectors SEL1, SEL2 and SEL3 each of which selects either one of the positive-phase triangular wave carrier signal and antiphase triangular carrier signal generated by the triangular wave generator 241, comparators 243a, 243b and 243c which respectively compare the selected carrier signals and the voltage values Vu, Vv and Vw generated by the vector controller 230 and output pulse signals UPWM, VPWM and WPWM having pulse widths corresponding to the voltage values, and an intermediate voltage determination circuit 244 which mutually compares the voltage values Vu, Vv and Vw supplied from the vector controller 230 and generates signals MU, MV and MW indicative of phases of intermediate potentials.

The intermediate voltage determination circuit 244 comprises comparators CMP1, CMP2 and CMP3 which respectively compare the voltage values Vu, Vv and Vw supplied from the vector controller 230 two by two and determine their magnitudes, three-input AND gates G1 through G6 which respectively input the outputs of these three comparators and any of their inverted signals, and OR gates G11, G12 and G13 which respectively OR the outputs of G1 and G2, G3 and G4, and G5 and G6 of these gates. The intermediate voltage determination circuit 244 is configured such that any one of the signals MU, MV and MW outputted from the OR gates G11, G12 and G13, which corresponds to each of the phases of the intermediate potentials of the voltage values Vu, Vv and Vw, is brought to a high level. Then, these signals MU, MV and MW are supplied to the sample-and-hold signal generator 250 shown in FIG. 11. The triangular wave generator 241 can be made up of, for example an oscillator, an integration circuit and inverters.

Figure 14:
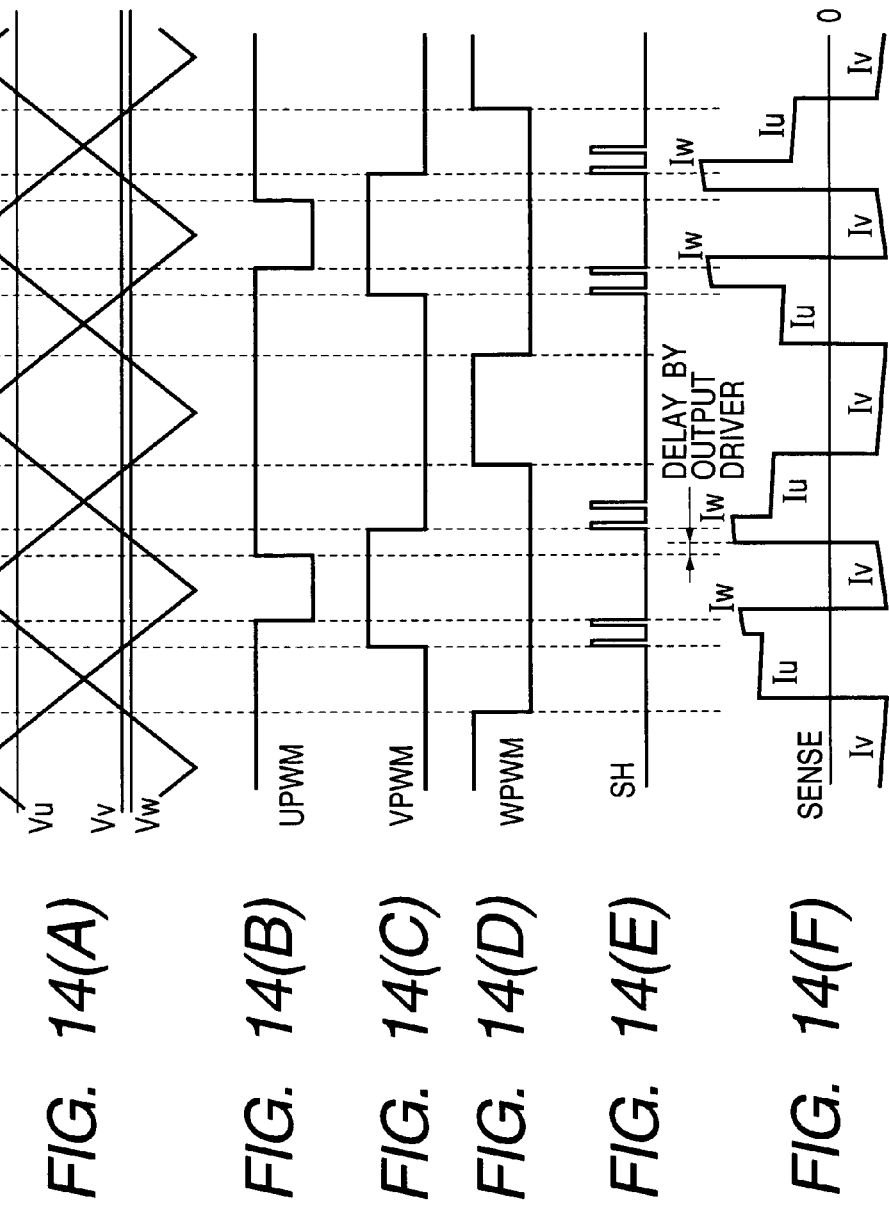
FIGS. 14(A)–14(F) are timing charts illustrating timings of a triangular wave carrier signal, PWM control signals and a sample-and-hold signal employed in the motor drive control circuit according to the embodiment.
Figure 15:
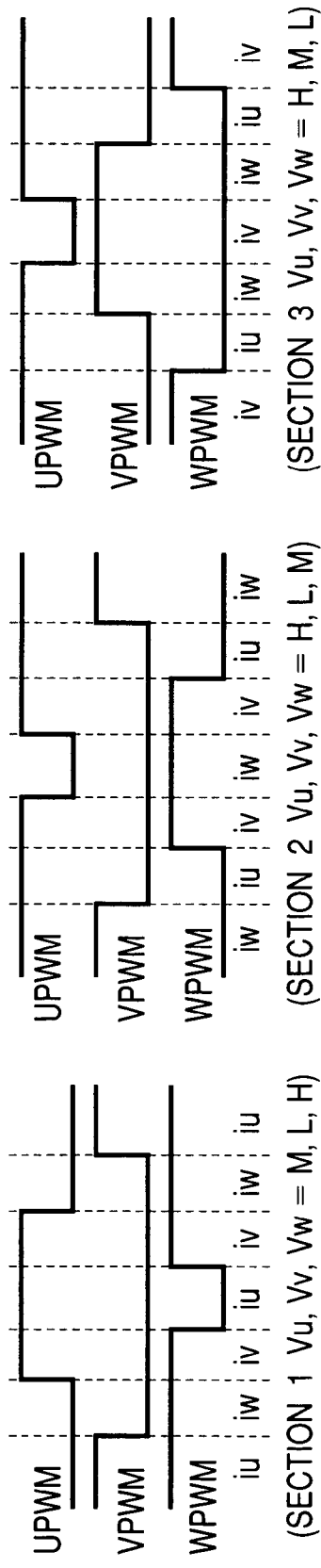
FIGS. 15(A)–15(F) are timing charts showing the relationship between levels of PWM control signals of respective phases and detectable currents at respective sections obtained by dividing an electrical angle of 360° into six according to magnitudes of voltage values in the motor drive control circuit according to the embodiment.

The operation of the motor drive control circuit according to the present embodiment will next be described using timing charts shown in FIGS. 13 through 15.

In the present embodiment, the two positive-phase and antiphase triangular wave carrier signals are generated by the triangular wave generator 241. The positive-phase or antiphase triangular wave carrier signal is supplied to the comparators 243a, 243b and 243c by the selectors SEL1 through SEL3 controlled by the signals MU, MV and MW outputted from the intermediate voltage determination circuit 244. Described specifically, the antiphase triangular wave carrier signal is supplied to the comparator corresponding to the phase of the intermediate potential of the voltage values Vu, Vv and Vw, whereas the positive-phase triangular wave carrier signal is supplied to the comparators corresponding to the phases of the high and low potentials. The comparators respectively compare the supplied triangular wave carrier signals and the voltage values Vu, Vv and Vw and thereby generates the pulse signals UPWM, VPWM and WPWM.

Figure 13:
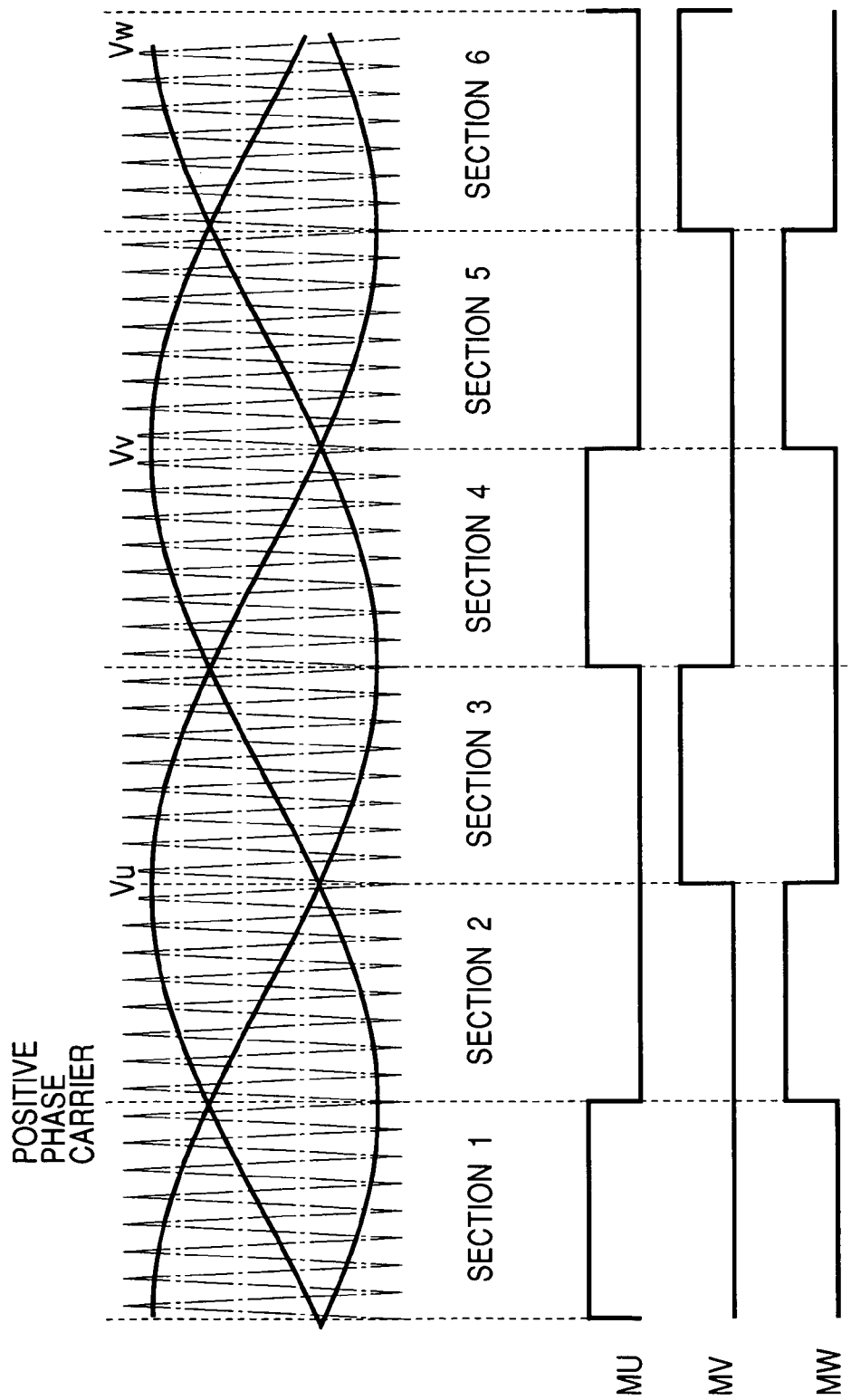
FIG. 13 is a timing chart showing timings of signals MU, MV, and MW indicative of phases of intermediate potentials generated by the PWM signal generator.
Figure 24:
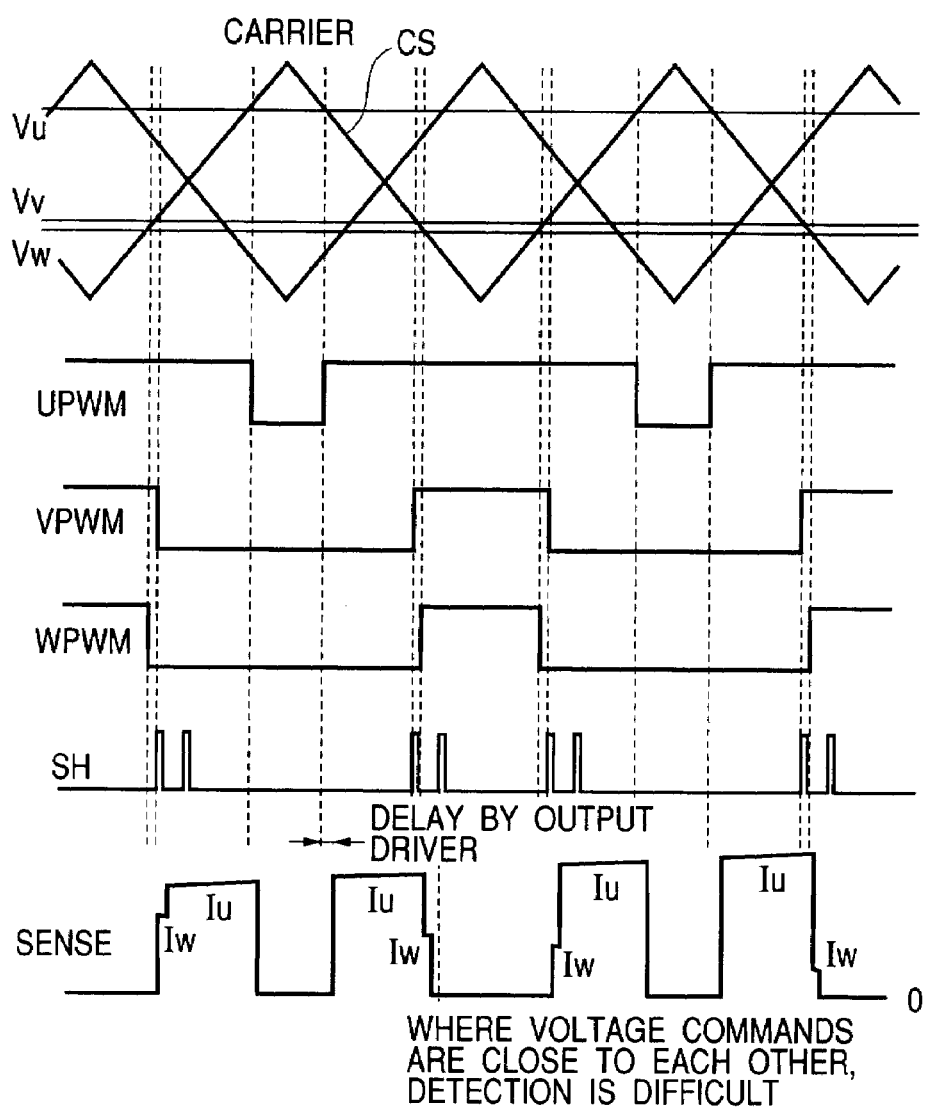
FIG. 24 is a timing chart showing timings of a triangular wave carrier signal, PWM control signals and a sample-and-hold signal employed in the sine wave drive system of the conventional three-phase DC motor.

Thus, the output signals MU, MV and MW of the intermediate voltage determination circuit 244 change as shown in FIG. 13 according to the voltage values Vu, Vv and Vw. When the voltage Vv for the V phase of the voltage values Vu, Vv and Vw is of the intermediate potential as in FIG. 14 showing, in an enlarged form, the neighborhood of the boundary between sections 2 and 3 of FIG. 13 by way of example, each of the pulse signals UPWM, VPWM and WPWM results in a signal whose phase is displaced 180° with respect to a pulse signal VPWM of FIG. 24 in which the pulse signal VPWM for the V phase is generated based on a positive-phase triangular wave carrier signal alone.

In the present embodiment, the signals MU, MV and MW indicative of the phases of the intermediate potentials of the voltage values Vu, Vv and w are supplied to the sample-and-hold signal generator 250 of FIG. 11, where signals for providing sampling timings of current values are generated. Therefore, the sample-and-hold signal SH generated by the sample-and-hold signal generator 250 results in two signals synchronized with the rising edge and falling edge of the pulse signal VPWM generated based on the antiphase triangular wave carrier signal as shown in FIG. 14. Thus, even when the two voltages (Vv and Vw in FIG. 14) of the voltage values Vu, Vv and Vw are close to each other, the period taken to detect each of current values of the coils for the detected phases (U phase and W phase in FIG. 14) can be sufficiently ensured.

The sample-and-hold signal generator 250 employed in the present embodiment further generates sample-and-hold signals delayed predetermined time intervals from these sample-and-hold signals SH and detects current values of the coils for the two phases by twice in succession respectively. Then the current reproduction unit 220 averages the two current values detected during a section 1 and outputs the same as reproduction currents iuc, ivc and iwc. Thus, high-accuracy current detection and rotation drive control high in accuracy owing to it are enabled. The detection of currents flowing through the coils by only sample-and-hold signals synchronized with the rising edge and falling edge of the pulse signal may be performed in place of the detection of coil's currents by both the sample-and-hold signals synchronized with the rising edge and falling edge of the pulse signal VPWM generated based on the antiphase triangular wave carrier signal, and the sample-and-hold signals delayed by the predetermined time intervals therefrom.

Figure 23:
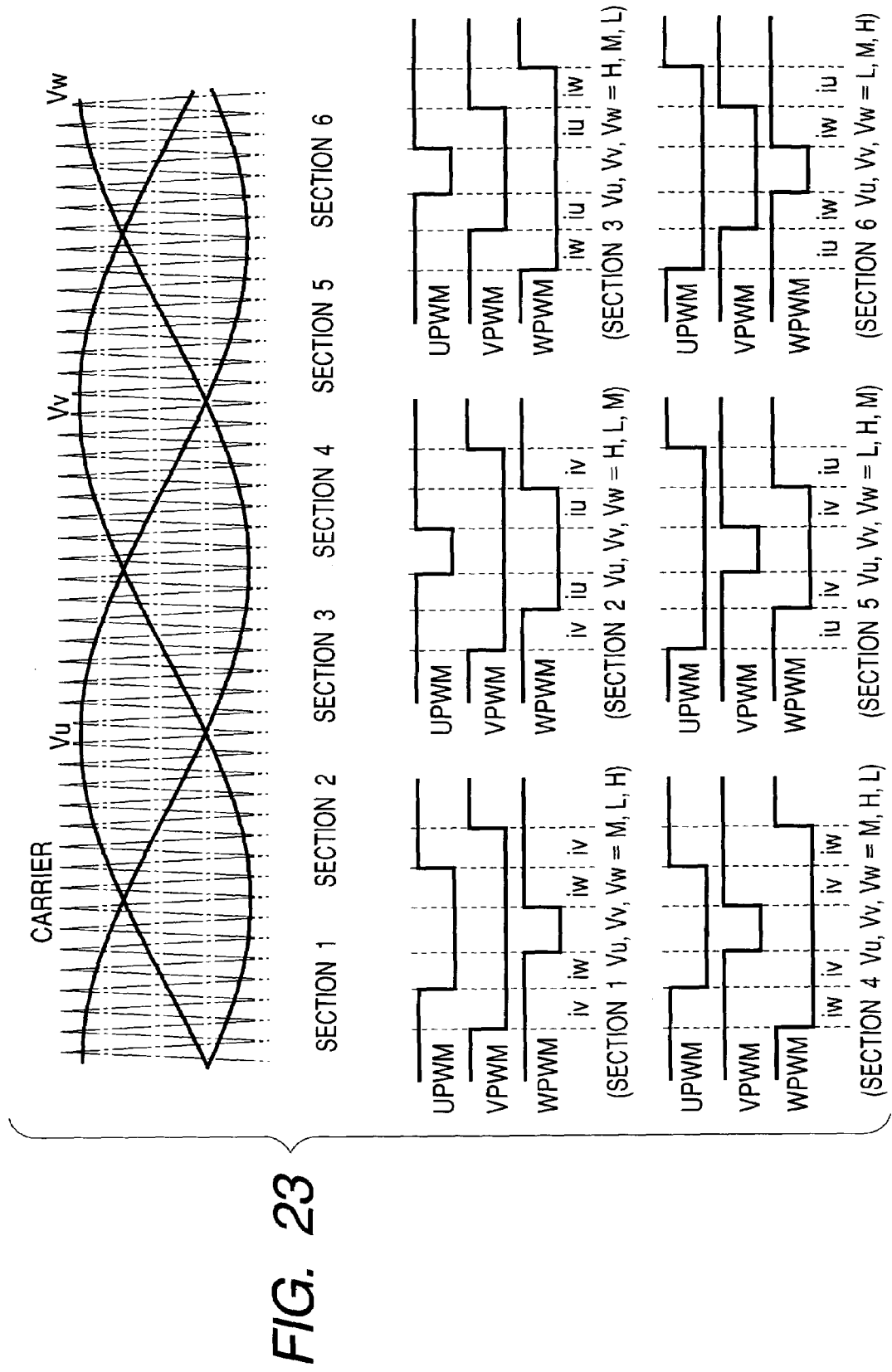
FIG. 23 is a timing chart illustrating the relationship between levels of PWM control signals of respective phases and detectable currents at respective sections obtained by dividing an electrical angle of 360° into six according to magnitudes of voltage values in a sine wave drive system of a conventional three-phase DC motor.

FIG. 14(F) shows a waveform of a current detected by the sense resistor Rsns in the motor drive control circuit according to the present embodiment. It is understood that when this current waveform and a current waveform of FIG. 14(F) detected in the conventional motor drive control circuit are compared, accurate current values can be sampled with margins by the sample-and-hold signals SH in the case of the present embodiment rather than in the conventional example. In the present embodiment as well, as apparent from a comparison between FIG. 15 indicative of timings corresponding to FIG. 23, phase currents respectively obtained by calculation can be detected even during sections in FIG. 23 undetectable due to phase lags between the pulse signals UPWM, VPWM and WPWM. Incidentally, even in the present embodiment, the coil currents for the two phases are detected by the sense resistor during the respective sections, and the coil current for the remaining phase may be obtained by calculation (e.g., iu=−iv−iw).

Figure 16:
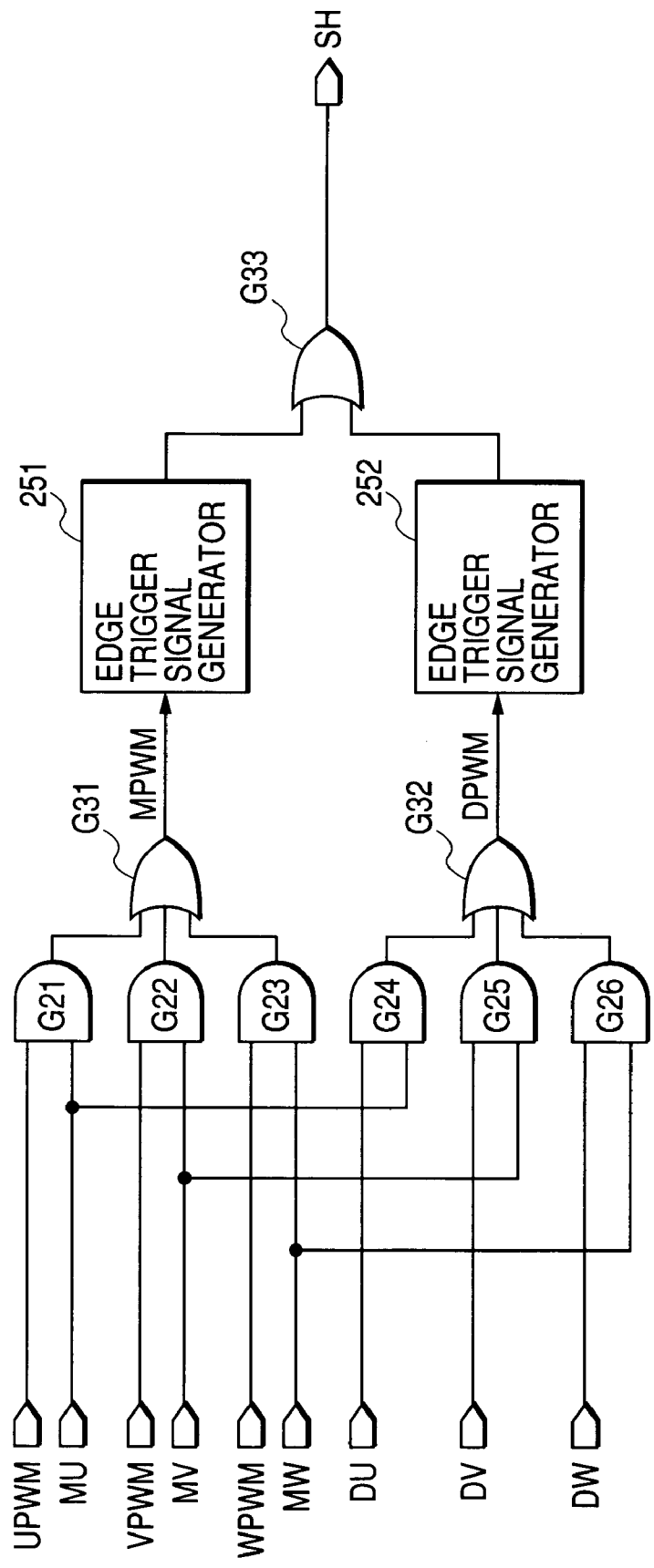
FIG. 16 is a block diagram illustrating a configurational example of a sample-and-hold signal generator employed in the motor drive control circuit shown in FIG. 11.

A configurational example of the sample-and-hold signal generator 250 is shown in FIG. 16. Referring to the figure, UPWM, VPWM and WPWM respectively indicate pulses signals supplied from the PWM signal generator 220 to the output driver 110, MU, MV and MW respectively indicate signals indicative of phases corresponding to intermediate potentials of the voltage values Vu, Vv and Vw outputted from the vector controller 230 to the PWM signal generator 220, and DU, DV and DW respectively indicate delay signals of the PWM signals outputted from the output driver 110.

The sample-and-hold signal generator 250 comprises AND gates G21, G22 and G23 which respectively input the pulse signals UPWM, VPWM and WPWM and the signals MU, MV and MW indicative of the intermediate potential phases, AND gates G24, G25 and G26 which respectively input the signals MU, MV and MW and the delay signals DU, DV and DW, an OR gate G31 which ORs the outputs of the AND gates G21 through G23, an OR gate G32 which ORs the outputs of the AND gates G24 through G26, edge trigger signal generators 51 and 52 which respectively detect the rising edges and falling edges of a signal MPWM outputted from the OR gate G31 and a signal DPWM outputted from the OR gate G32 to thereby generate edge trigger signals, and an OR gate G33 which ORs the generated edge trigger signals and outputs the ORing thereof as a sample-and-hold signal SH.

Figure 17:
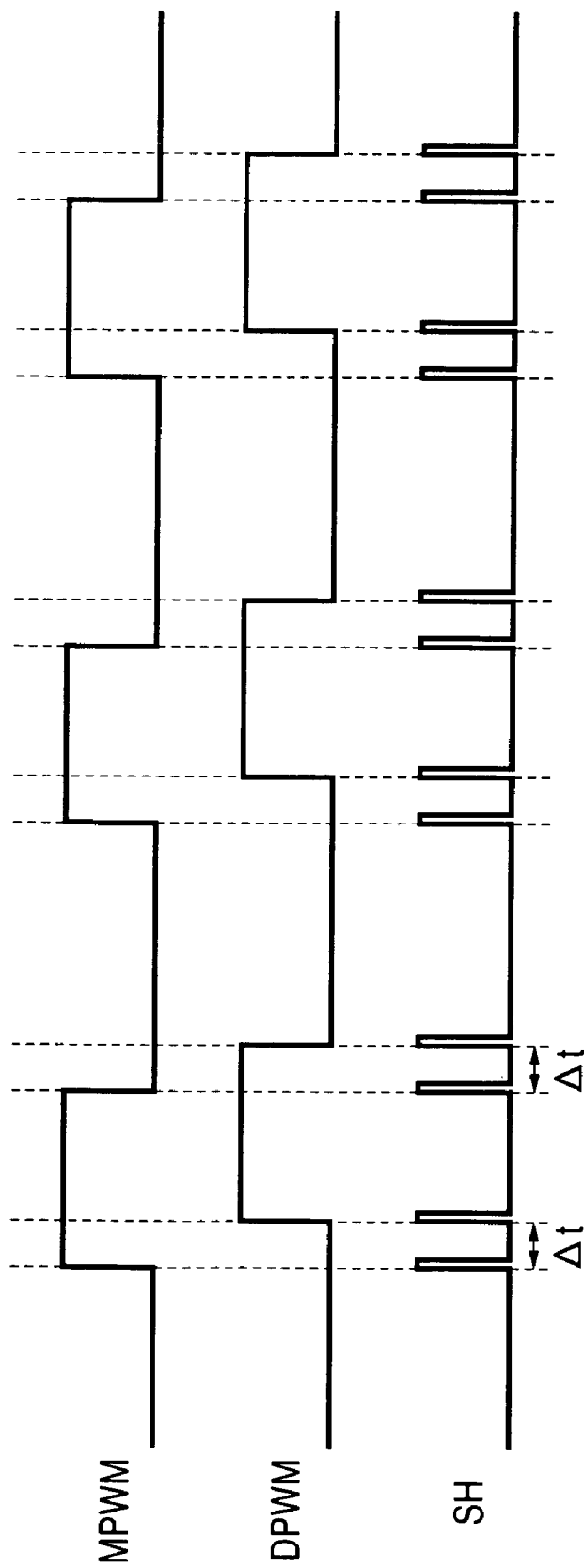
FIG. 17 is a timing chart showing the relationship between signals in the sample-and-hold signal generator of FIG. 16 and a sample-and-hold signal outputted therefrom.

Since the delay signals DU, DV and DW fed back from the output driver 110 are respectively signals obtained by delaying the pulse signals UPWM, VPWM and WPWM by a predetermined amount ($\Delta t$) in the output driver 110, the edge trigger signal generated by detecting the rising edge and falling edge of the output signal MPWM of the OR gate G31, and the edge trigger signal generated by detecting the rising edge and falling edge of the output signal DPWM of the OR gate G32 result in signals with a time difference of $\Delta t$ at all times as shown in FIG. 17, thus making it possible to perform accurate sampling.

Figure 18:
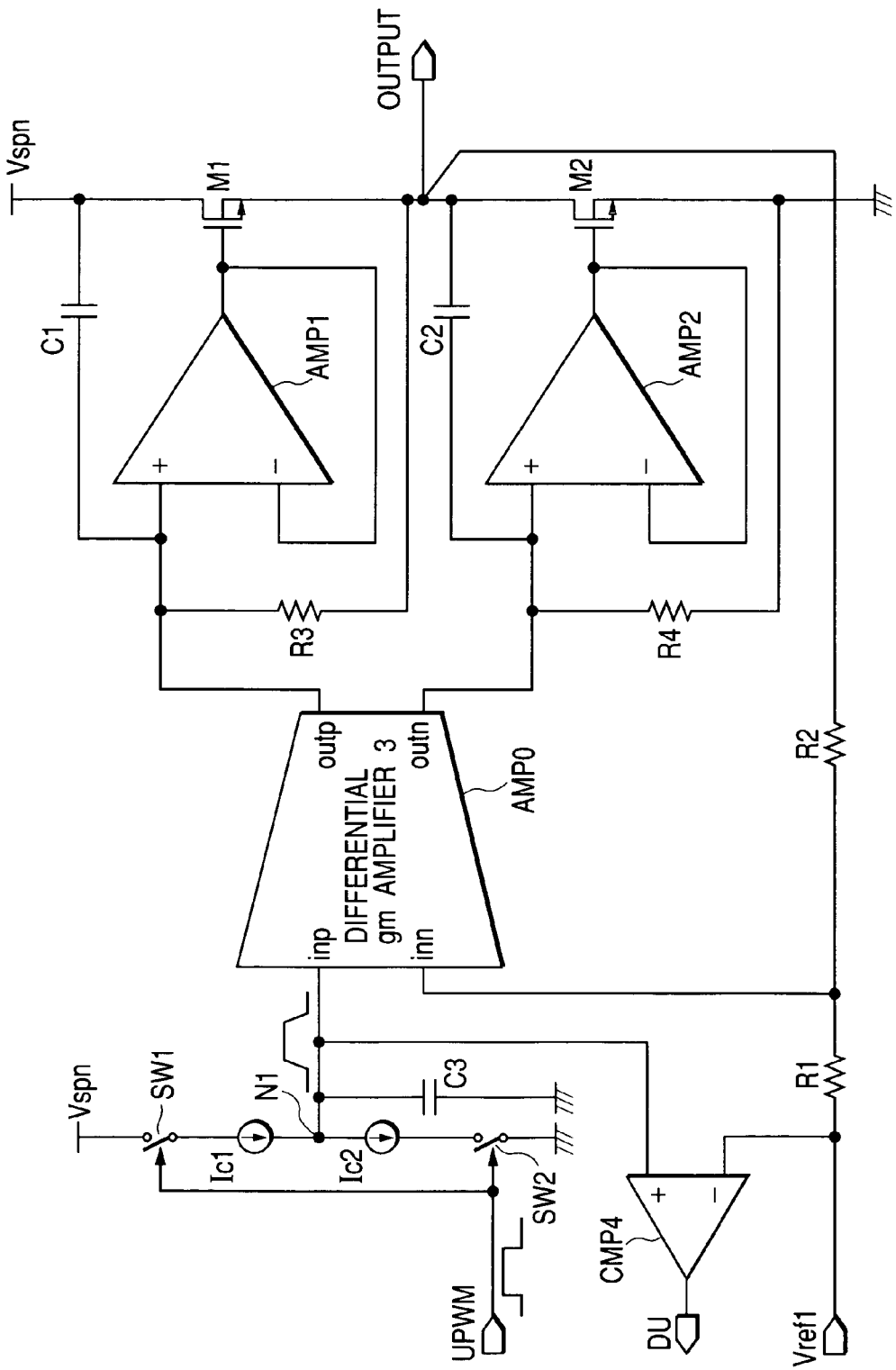
FIG. 18 is a circuit configurational diagram illustrating a configurational example of an output driver employed in the motor drive control circuit shown in FIG. 11.

FIG. 18 shows a configurational example of the pre-driver 111 of the output driver 110, which is associated with the output transistors M1 and M2 that apply the voltage to the coil of the U phase.

The pre-driver 111 comprises switches SW1 and SW2 which are complementarily turned on and off by the pulse signal UPWM supplied from the PWM signal generator 240, constant current sources Ic1 and Ic2 connected in series with the switches SW1 and SW2, an integral capacitor C3 connected between a connecting node N1 of the constant current sources Ic1 and Ic2 and a ground point, a gm amplifier AMP0 which has a positive-phase input terminal to which the potential of the node N1 is inputted, and a negative-phase input terminal to which the voltage obtained by dividing the difference between the voltage of an output terminal to which a coil is connected, and a reference voltage Vref by a ratio between resistors R1 and R2, is inputted, and which outputs currents each corresponding to the difference between the input potentials, a resistor R3 which converts the output current on the positive phase side of the gm amplifier into the voltage, a resistor R4 which converts the output current on the negative phase side of the gm amplifier into the voltage, a pair of buffer amplifiers AMP1 and AMP2 operated as a voltage follower which drives the gates of the output transistors M1 and M2 in accordance with the converted voltages respectively, phase compensating capacitors C1 and C2 respectively connected between non-inversion input terminals of the buffer amplifiers AMP1 and AMP2 and a power supply voltage terminal, and a comparator CMP4 which compares the potential of the connecting node N1 of the constant current sources Ic1 and Ic2 and the reference voltage Vref.

The voltage of the output terminal to which the coil is connected, is fed back to the negative-phase input terminal of the gm amplifier AMP0 via the resistor R2. Thus, the gm amplifier AMP0 is operated in such a manner that a through rate of an output voltage and an operation delay time are determined based on the slope of the input potential on the positive phase side of the gm amplifier AMP0. The buffer amplifiers AMP1 and AMP2 are provided because since the output transistors M1 and M2 are large in size, their gate capacitances are also large, and a driving force becomes deficient to directly drive the transistors by the outputs of the gm amplifier AMP0 while a desired characteristic is being maintained. Other pre-drivers 112 and 113 have configurations similar to the pre-driver 111 shown in FIG. 18.

In the output driver 111 employed in the present embodiment, the input pulse signal UPWM is converted into a signal having predetermined slopes on the rising edge and falling edge thereof by the integral capacitor C3, which in turn is inputted to the gm amplifier AMP0. The slopes of the signal inputted to the gm amplifier AMP0 are determined by the capacitance value of the integral capacitor C3 and the values of currents flowing through the constant current sources Ic1 and Ic2. The comparator CMP compares the signal having such predetermined slopes and the reference voltage Vref and thereby generates a delay signal DU. Therefore, if the input pulse signal UPWM is shifted, then the delay signal DU is also shifted correspondingly. Thus, the time differences Δt of the sample-and-hold signals SH shown in FIG. 17 are always kept constant, and hence each detected current can be sampled with the optimum timing. Even if the operation delay time of the output stage varies due to variations in the slopes developed by the integral capacitor C3, the delay signals DU, DV and DW vary similarly. It is therefore possible to always ensure the optimum timing.

Figure 19:
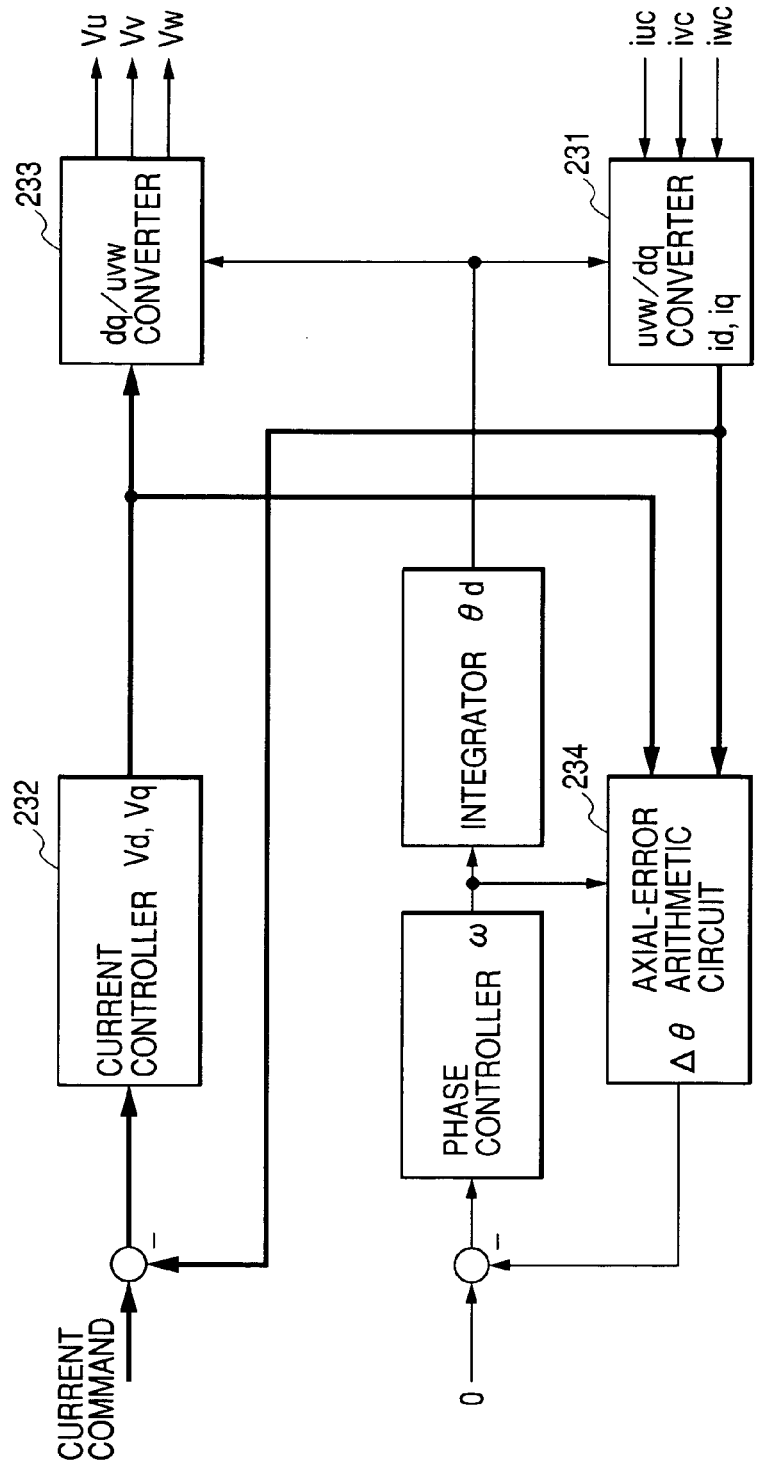
FIG. 19 is a block diagram depicting a configurational example of a vector controller employed in the motor drive control circuit shown in FIG. 11.

A configurational example of the vector controller 230 is illustrated in FIG. 19.

The vector controller 230 comprises a uvw/dq converter 231 which coordinate-transforms reproduction currents iuc, ivc and iwc into two-phase DC currents id and iq, a current controller 232 which adjusts or controls voltages Vd and Vq so that the transformed currents id and iq and a current command value become equal, a dq/uvw converter 233 which inverse coordinate-transforms Vd and Vq to generate three-phase AC voltages Vu, Vv and Vw, an axial-error arithmetic circuit 234 which computes an axial error Δθ from Vd and Vq, id and iq, and a rotation signal ω, a phase controller 235 and an integrator 236. The phase controller 235 and the integrator 236 performs PLL (Phase-Locked Loop) control in such a manner that the axial error Δθ becomes "0".

Incidentally, the vector controller 230 controls the amplitudes and phases of the three-phase sine wave voltage values Vu, Vv and Vw, based on the reproduction currents iuc, ivc and iwc sent from the current reproduction unit 220 and the current command value sent from the controller in order to drive the motor at suitable torque. Since the vector controller 230 shown in FIG. 19 is similar in configuration to the known vector controller, its detailed description is omitted. The rotation signal ω detected by the phase controller 235 is supplied even to the out-of-drawing controller, which sends a current command value in accordance with the detected number of rotations.

Figure 20:
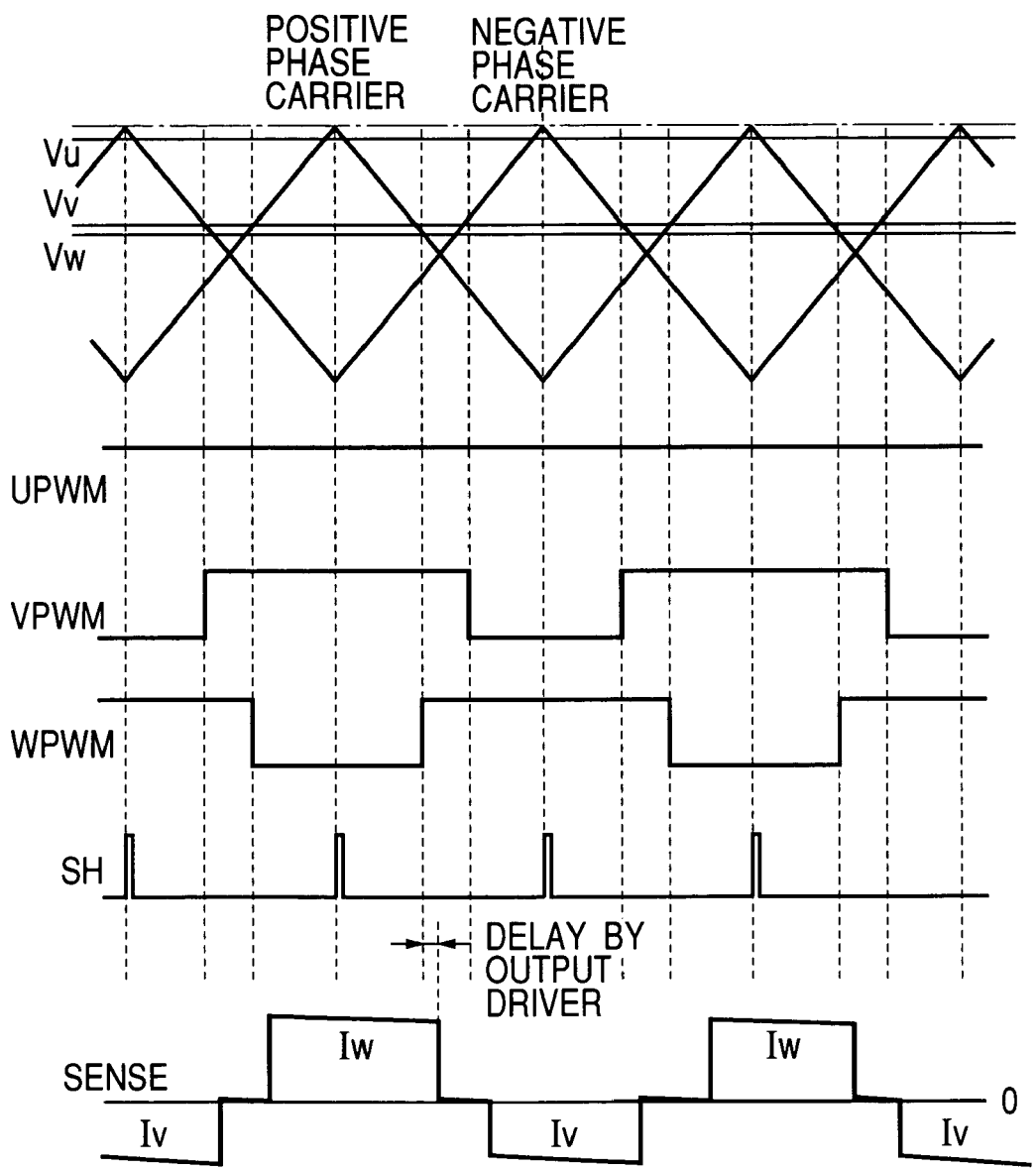
FIG. 20 is a timing chart showing timings of a triangular wave carrier signal, PWM control signals and a sample-and-hold signal employed in another embodiment of a rotation drive control circuit based on a sine wave drive system, to which the present invention is applied.

Another embodiment of a rotation drive control circuit based on a sine wave drive system will next be explained using FIG. 20.

The rotation drive control circuit according to the present embodiment is substantially similar in configuration to the rotation drive control circuit according to the embodiment of FIG. 11. A point different from the embodiment circuit shown in FIG. 11 resides in that the present invention is applied to a rotation drive control circuit wherein in place of PWM control effected on all of three phases, one phase (U phase in FIG. 20) is set such that a coil command value (Vu) is fixed to a high level and a control signal (UPWM) is used as a signal fixed to a 100% duty, whereas PWM control for changing duty is effected only on two phases (V phase and W phase).

Even when the present invention is applied to the two-phase PWM control, positive-phase and negative-phase triangular carrier signals are generated. By generating PWM control signals VPWM and WPWM by the positive-phase and antiphase triangular wave carrier signals, the currents can be detected accurately even when voltage values Vv and Vw are close to each other. Sample-and-hold signals SH for current detection may be generated in accordance with timings at the tops of the respective carrier signals. If the present embodiment is applied, then only the two phases may be utilized to generate the PWM control signals, and the averaging of sampled currents also becomes unnecessary, thereby bringing about an advantage that the circuit is substantially simplified. Incidentally, one phase may be fixed to a low level as an alternative to being fixed to the high level.

Figure 21:
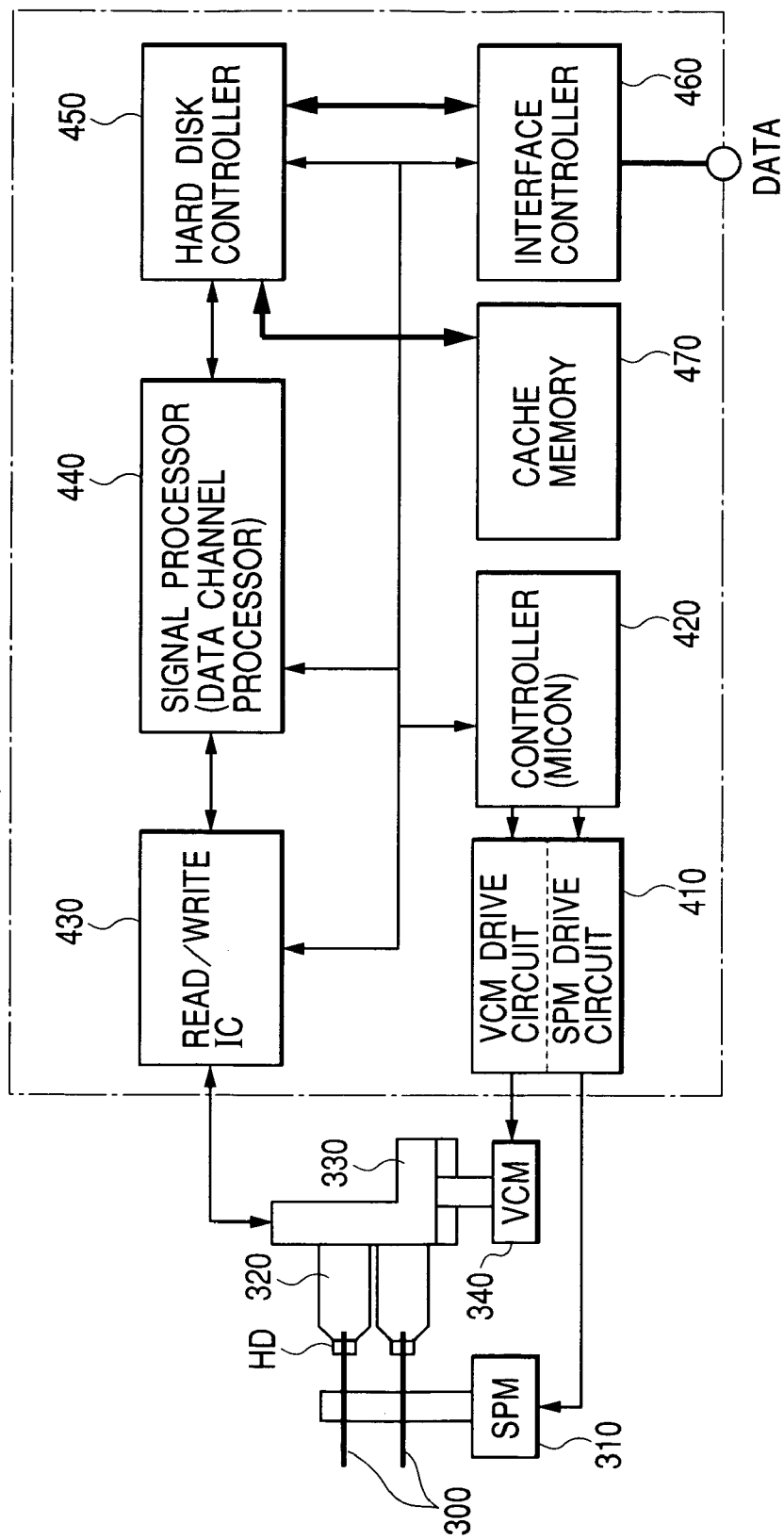
FIG. 21 is a block diagram depicting one configurational example of a hard disk drive illustrated as one example of a system using a motor drive control circuit to which the present invention is applied.
Figure 22:
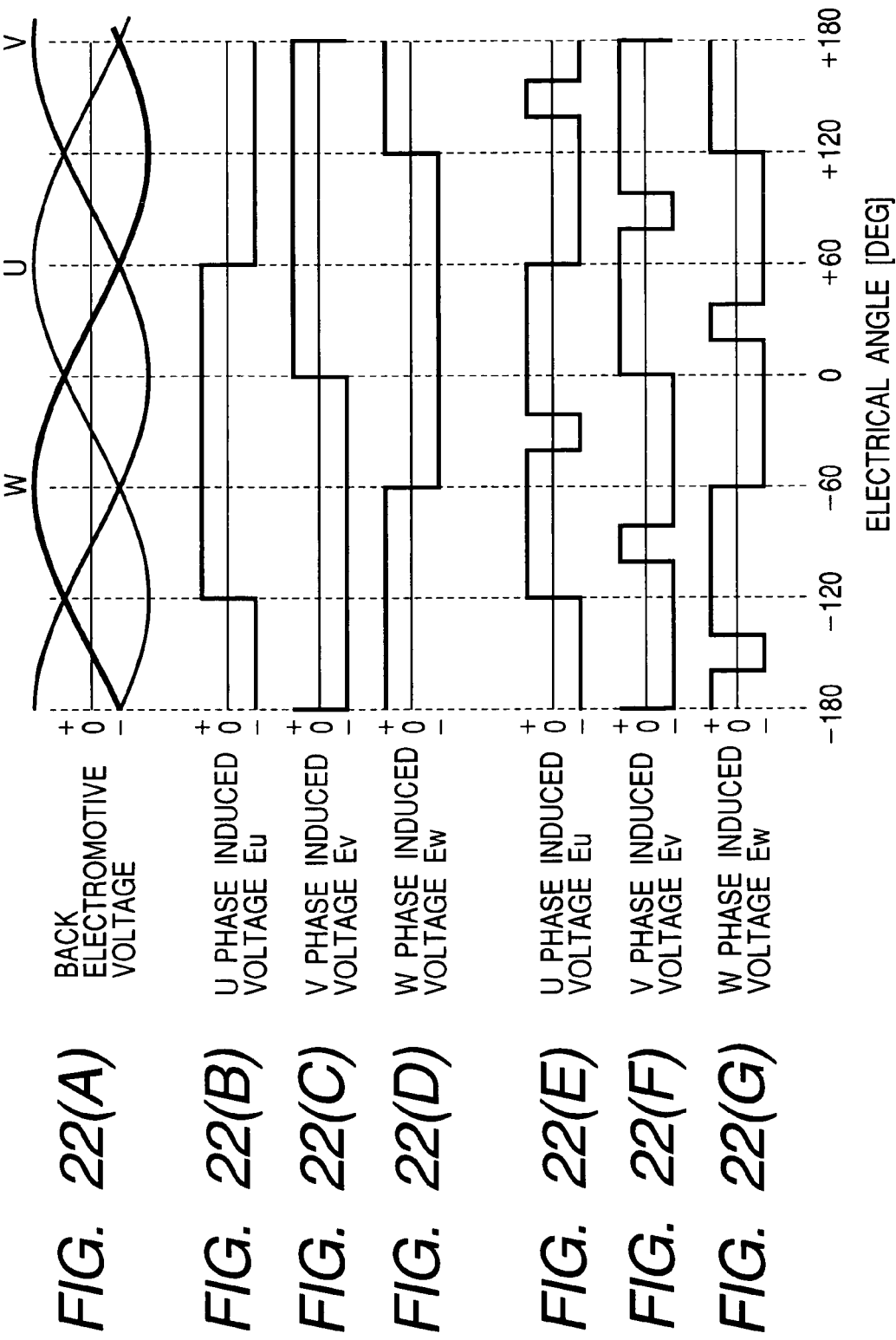
FIGS. 22(A)–22(G) are waveform diagrams showing the relationship between polarities of induced voltages and phases of back electromotive voltages in a general three-phase DC motor and a special three-phase DC motor.

FIG. 21 shows, in a block diagram, one configurational example of the whole hard disk drive illustrated as one example of a magnetic disk system having a voice coil motor control system and a magnetic head drive control system in addition to a spindle motor control system using a motor drive control circuit to which the present invention is applied.

Referring to FIG. 21, reference numeral 310 indicates a spindle motor which rotates a magnetic disk 300, reference numeral 320 indicates an arm having a magnetic head (including a write magnetic head and a read magnetic head) HD at its leading end, and reference numeral 330 indicates a carriage which rotatably holds the arm 320. The voice coil motor 340 moves the carriage 330 to shift the magnetic head. A motor drive control circuit 410 performs servo control so as to cause the center of the magnetic head to coincide with the center of a track.

The motor drive control circuit 410 is a semiconductor integrated circuit in which a spindle motor drive control circuit having such a function as described in the above embodiment and a voice coil motor drive control circuit for moving the magnetic head in a radial direction of a disk are integrally configured. The motor drive control circuit 410 is operated in accordance with control signals supplied from the controller 420 to thereby servo-control the voice coil motor 340 and the spindle motor 310 so as to seek-move the magnetic head onto a desired track and cause the relative velocity of the magnetic head to be kept constant.

Reference numeral 430 indicates a read/write IC which amplifies a current corresponding to a change in magnetism detected by the magnetic head HD and transmits a read signal to a signal processor (data channel processor) 440, and amplifies a write pulse signal outputted from the signal processor 440 and outputs a current for driving the magnetic head HD.

Reference numeral 450 designates a hard disk controller which fetches or takes in read data transmitted from the signal processor 440 and thereby effects an error correcting process on it and effects an error correcting/coding process on write data sent from a host, and outputs the result of their processes to the signal processor 440. The signal processor 440 performs a modulation/demodulation process suitable for use in digital magnetic recording and signal processing such as waveform shaping having taken magnetic recording characteristics into consideration and reads positional information from a read signal of the magnetic head HD.

Reference numeral 460 indicates an interface controller which performs the transfer and control or the like of data between the present system and an external device. The hard disk controller 450 is connected to a host computer such as a microcomputer of a main body of a personal computer via the interface controller 460. Reference numeral 470 indicates a cache memory for buffer, which temporarily stores read data read from the magnetic disk at high speed. The system controller 420 comprising a microcomputer makes a decision as to any of operation modes, based on a signal transmitted from the hard disk controller 450 and controls the respective parts of the system in association with the operation modes. Further, the system controller 420 calculates a sector position and the like on the basis of address information supplied from the hard disk controller 450.

While the invention made above by the present inventors has been described specifically based on the illustrated embodiments, the present invention is not limited to the embodiments. It is needless to say that various changes can be made thereto within the scope not departing from the substance thereof. While the circuit for driving and controlling the three-phase DC motor has been described as an illustrative example in the motor drive control circuit according to the embodiment, for example, the present invention can be applied even to a multi-phase DC motor other than the three-phase DC motor even if the motor is of such a multi-phase DC motor.

While the above embodiment has described the case in which the positive-phase and negative-phase signals are generated as the triangular wave carrier signals for generating the PWM control signals that control the driver for causing the drive currents to flow through the coils, there is no need to generate the triangular wave carrier signals as the waveform signals, and triangular wave information for providing functions similar to the triangular wave signals can be generated and utilized using an up/down counter, for example. When the counter is used, an arithmetic circuit can be used as an alternative to the comparators for comparing the triangular wave carrier signals and the command voltage values and thereby generating the PWM signals.

While the above description has principally been made of the case in which the invention made by the present inventors is applied to the motor driver device of the hard disk storage system which belongs to the field of application reaching the background of the invention, the present invention is not limited to it. The present invention can be widely used in, for example, a motor drive control device which drives brushless motors such as a motor for rotating a polygon mirror of a laser beam printer, an axial-flow fan motor, etc.

Advantageous effects obtained by representative ones of the inventions disclosed in the present application will be described in brief as follows:

According to the present invention, the levels of induced voltages are detected as well as the polarities thereof and the relationship between their magnitudes is determined, whereby phases to be energized at start-up are decided. Therefore, even if a motor of such a type that each induced voltage causes polarity inversion temporarily is used, it can be started up without causing it reverse rotation.

Upon drive control of a multi-phase DC motor based on a sine wave current drive system, it is possible to accurately detect currents flowing through respective coils without providing de-energization periods, and apply control voltages high in accuracy to the respective coils to cause sine wave currents to flow therethrough, thereby rotating the motor smoothly. Consequently, the motor can be rotated with a less reduction in rotational vibration and at low noise and low vibration. When the present invention is applied to a rotation drive control device of a spindle motor in a magnetic disk system, high-density magnetic storage is enabled.

The accurate driving of sine wave currents is made possible even in a low number-of-revolutions state in which voltage values to be applied to coils for respective phases are close to each other. Thus, an advantageous effect can be obtained in that the motor can be rotated at the maximum drive torque even during acceleration immediately following the start-up of the motor, and the start-up time up to the state of steady rotation can be shortened as compared with acceleration based on synchronous driving or the like for carrying out the external input of each phase switching timing.

What is claimed is:

1. A rotation drive control device of a three-phase DC motor comprising:
    a drive control unit; and
    a three-phase DC motor including three-phase coils and a rotor,
    wherein the drive control unit generates a first current that flows through each of any two phases of the three-phase coils to detect a polarity of an induced voltage induced in a de-energized phase of the three-phase coils so as to determine a direction of energization and corresponding two phase coils through which a second current flows to rotate the rotor,
    wherein the drive control unit controls a start-up of the three-phase DC motor based upon a first determination in connection with the direction of energization and the corresponding two phase coils,
    wherein the rotor does not respond to the first current,
    wherein when the drive control unit determines that any two detected levels of the induced voltages are larger than a predetermined level, the drive control unit determines the direction of energization and the corresponding two phase coils by using two detected polarities of the induced voltages in connection with said any two detected levels, so as to rotate the rotor based upon the direction of energization and the corresponding two phase coils thereof are determined, and
    wherein when the drive control unit determinates that said any two detected levels in connection with the induced voltages are larger than the predetermined level, the drive control unit determines the direction of the energization and the corresponding two phase coils by ignoring a detection result of a polarity of an induced voltage of the de-energized phase of the three-phase coils whose induced voltage is smaller than the predetermined level.

2. The rotation drive control device of three-phase DC motor according to claim 1,
    wherein the drive control unit includes a comparator or an arithmetic circuit which determines whether a detected level of the induced voltage of each de-energized phase of the three-phase coils is larger or smaller than the predetermined level, and registers which store the results of determination every phases together with the polarity of the induced voltage in each de-energized phase of the three phase coils.

3. The rotation drive control device of three-phase DC motor according to claim 2,
    wherein the drive control unit further includes a decoder which decodes outputs of the registers and outputs a signal indicative in connection with the direction of energization and corresponding two phase coils.

4. The rotation drive control device of three-phase DC motor according to claim 3,
    wherein the drive control unit further includes a rotation determining unit which compares a previous output of the signal indicative with a present output of the signal indicative so as to determine normal rotation or reverse rotation of the rotor.

5. A method of starting up a three-phase DC motor including three-phase coils and a rotor, comprising:
    generating a first current to flow through each of any two phases of the three-phase coils to detect a polarity of an induced voltage induced in a de-energized phase of the three-phase coils by a drive control unit driving and controlling the three-phase DC motor, thereby determining a direction of energization and corresponding two phase coils through which a second current flows to rotate the rotor;

based upon determining that any two detected levels of the induced voltages are larger than a predetermined level, determining the direction of energization and the corresponding two phase coils by using two detected polarities of the induced voltages in connection with said any two detected levels thereby rotating the rotor based upon the direction of energization and the corresponding two phase coils thereof are determined; and driving the three-phase DC motor based upon a first determination in connection with the direction of the energization and the corresponding two phase coils, wherein the rotor does not response by the first current, and wherein when the drive control unit determinates that said any two detected levels in connection with the induced voltages are larger than the predetermined level, the drive control unit determines the direction of the energization and the corresponding two phase coils by ignoring a detection result of a polarity of an induced voltage of the de-energized phase of the three-phase coils whose induced voltage is smaller than the predetermined level.

6. The method according to claim 5, further comprising steps of:

comparing a previous output of a signal indicative in connection with the direction of energization and the corresponding two phase coils with a present output of the signal indicative in connection with the direction of energization and the corresponding two phase coils thereby determining normal rotation or reverse rotation of the rotor.

7. The method of starting up a three-phase DC motor according to claim 5, further comprising a step of energizing based on the direction of the energization and the corresponding two phase coils by detecting only a polarity of an one phase which is respected subsequent the polarity changed so as to rotate the rotor after determining normally rotation of the rotor.

8. The method of starting up a three-phase DC motor according to claim 7, further comprising a step of confirming whether the rotor is rotated at a predetermined electrical degrees or a predetermined number of times or more so as to proceed to the step of energizing.

9. A rotation drive control system of a three-phase DC motor comprising:

a drive control unit including a driver, a current detection unit, a PWM signal generator and a vector controller; the PWM signal generator including a triangular wave generator, and a comparison unit; and a three-phase DC motor including three-phase coils and a rotor, wherein the drive control unit generates a current command value, wherein the current detection unit executes a current detection of a current which flows through the three-phase coils, wherein the vector controller generates a first indicative voltage corresponding to a first phase of the three-phase coils, a second indicative voltage corresponding to a second phase of the three-phase coils and a third indicative voltage corresponding to a third phase of the three-phase coils by detecting a difference between a result of the current detection and the current command value, wherein the PWM signal generator generates and outputs a first PWM signal, a second PWM signal, and a third PWM signal, wherein the driver drives the three-phase DC motor based on the first PWM signal, the second PWM signal, and the third PWM signal, wherein the triangular wave generator generates a positive phase triangular wave and a negative phase triangular wave, and wherein when the first indicative voltage is an intermediate potential between a voltage value of the second indicative voltage and a voltage value of the third indicative voltage and changes between the voltage values of the second and third indicative voltages, the first PWM signal is generated by the comparison unit which compares the negative phase triangular wave with the first indicative voltage, and the second PWM signal is generated by the comparison unit which compares the positive phase triangular wave with the second indicative voltage, wherein when the second indicative voltage is an intermediate potential between a voltage value of the first indicative voltage and a voltage value of the third indicative voltage and changes between the voltage values of the first and third indicative voltages, the second PWM signal is generated by the comparison unit which compares the negative phase triangular wave with the second indicative voltage, and the first PWM signal is generated by the comparison unit which compares the positive phase triangular wave with the first indicative voltage.

10. The rotation drive control system of three-phase DC motor according to claim 9, wherein the drive control unit further includes a sample-and-hold signal generator, wherein when the third indicative voltage is an intermediate potential between a voltage value of the second indicative voltage and a voltage value of the first indicative voltage and changes between the voltage values of the second and first indicative voltages, the third PWM signal is generated by the comparison unit which compares the negative phase triangular wave with the third indicative voltage, the second PWM signal is generated by the comparison unit which compares the positive phase triangular wave with the second indicative voltage, and the first PWM signal is generated by the comparison unit which compares the positive phase triangular wave with the first indicative voltage, wherein when the first indicative voltage is the intermediate potential between the voltage value of the second indicative voltage and the voltage value of the third indicative voltage and changes between the voltage values of the second and third indicative voltages, the sample-and-hold signal generator generates a sample-and-hold signal to synchronize with each of rising edges and falling edges of the first PWM signal, so as to give a detection timing in connection with the current detection, wherein when the second indicative voltage is the intermediate potential between the voltage value of the first indicative voltage and the voltage value of the third indicative voltage and changes between the voltage values of the first and third indicative voltages, the sample-and-hold signal generator generates a sample-and-hold signal to synchronize with each of rising edges and falling edges of the second PWM signal, so as to give a detection timing in connection with the current detection, wherein when the third indicative voltage is the intermediate potential between the voltage value of the second indicative voltage and the voltage value of the first indicative voltage and changes between the voltage values of the second and first indicative voltages, the sample-and-hold signal generator generates a sample-and-hold signal to synchronize with each of rising edges and falling edges of the third PWM signal, so as to give a detection timing in connection with the current detection.

11. The rotation drive control system of three-phase DC motor according to claim 9, wherein the third indicative voltage is set as a first fixed signal so as to set the third PWM signal as a second fixed signal to a 100% or 0% duty.

12. The rotation drive control system of three-phase DC motor according to claim 11, wherein the drive control unit includes a sample-and-hold signal generator which generates a sample-and-hold signal to synchronize with each of peak points of the positive phase triangular wave and the negative phase triangular wave so as to provide a detection timing in connection with the current detection.

13. A rotation drive control device of three-phase DC motor, comprising:
a drive control unit; and
a three-phase DC motor including three-phase coils and a rotor,
wherein the drive control unit generates a first current that flows through each of any two phases of the three-phase coils to detect a polarity of an induced voltage induced in a de-energized phase of the three-phase coils so as to determine a direction of energization and corresponding two phase coils through which a second current flows to rotate the rotor,
wherein the drive control unit controls a start-up of the three-phase DC motor based upon a first determination in connection with the direction of energization and the corresponding two phase coils,
wherein the rotor does not respond to the first current,
wherein when the drive control unit determines that any two detected levels of the induced voltages are larger than a predetermined level, the drive control unit determines the direction of energization and the corresponding two phase coils by using two detected polarities of the induced voltages in connection with said any two detected levels, so as to rotate the rotor based upon the direction of energization and the corresponding two phase coils thereof are determined, and
wherein when the drive control unit determinates that said two detected levels of the induced voltages are larger than the predetermined level, the drive control unit determines the direction of the energization and the corresponding two phase coils by inverting a detection result of a polarity of an induced voltage of a de-energized phase of the three-phase coils whose induced voltage is smaller than the predetermined level.

14. A rotation drive control device of a three-phase DC motor comprising:
a three-phase DC motor including three-phase coils and a rotor,
a drive unit which generates a first current that flows through two phases of the three-phase coils to detect a polarity of an induced voltage in a de-energized phase of the three-phase coils; and
a magnetic pole position detecting unit which determines a direction of energization and corresponding two phase coils by using any two detected levels in connection with the induced voltages in any two phase coils of the three-phase DC motor, when the magnetic pole position detecting unit determines that said any two detected levels are larger than a reference level,
wherein through the corresponding two phase coils, a second current flows to rotate the rotor, and
wherein when the drive control unit determinates that said two detected levels of the induced voltages are larger than the predetermined level, the drive control unit determines the direction of the energization and the corresponding two phase coils by inverting a detection result of a polarity of an induced voltage of the de-energized phase of the three-phase coils whose induced voltage is smaller than the predetermined level.

15. A rotation drive control device of a three-phase DC motor according to claim 14,
wherein the drive unit generates the second current, and wherein the rotor does not respond to the first current.

16. A rotation drive control device of a three-phase DC motor according to claim 15,
further comprising a rotation determining unit for determining a normal rotation or a reverse rotation of the rotor based on a present output and a previous output of an indicative signal in connection with the direction of energization and the corresponding two phase coils.

17. A rotation drive control device of a three-phase DC motor, comprising:
a three-phase DC motor including three-phase coils and a rotor,
a drive unit which generates a first current that flows through two phases of the three-phase coils to detect a polarity of an induced voltage in a de-energized phase of the three-phase coils; and
a magnetic pole position detecting unit which determines a direction of energization and corresponding two phase coils by using any two detected levels in connection with the induced voltages in any two phase coils of the three-phase DC motor, when the magnetic pole position detecting unit determines that said any two detected levels are larger than a reference level,
wherein through the corresponding two phase coils, a second current flows to rotate the rotor, and
wherein when the magnetic pole position detecting unit determinates that said any two detected levels are larger than the reference level, the magnetic pole position detecting unit determines the direction of the energization and the corresponding two phase coils by ignoring a detection result of a polarity of the induced voltage of an de-energized phase of the three-phase coils, the de-energized phase whose the induced voltage is smaller than the reference level.

18. A rotation drive control system of a three-phase DC motor comprising:
a three-phase DC motor including three-phase coils;
a current detection unit which executes a current detection of a current which flows through the three-phase coils so as to generate a first indicative voltage corresponding to a first phase of the three-phase coils, a second indicative voltage corresponding to a second phase of the three-phase coils, and a third indicative voltage corresponding to a third phase of the three-phase coils; and a PWM signal generator which generates a first PWM signal by comparing a negative phase triangular wave with the first indicative voltage and a second PWM signal by comparing a positive phase triangular wave with the second indicative voltage, when the first indicative voltage is between the second indicative voltage and the third indicative voltage, said PWM signal generator generating the second PWM signal by comparing a negative phase triangular wave with the second indicative voltage and the first PWM signal by comparing a positive phase triangular wave with the first indicative voltage, when the second indicative voltage is between the first indicative voltage and the third indicative voltage.

19. A rotation drive control system of a three-phase DC motor according to claim 18, further comprising a driver which drives the three-phase DC motor based on the first PWM signal, the second PWM signal, and a third PWM signal.

20. A rotation drive control system of a three-phase DC motor according to claim 19,
wherein the current detection unit includes a vector controller which generates the first indicative voltage, the second indicative voltage, and the third indicative voltage by detecting a difference between a result of the current detection and a current command value from a controller.

21. A rotation drive control system of a three-phase DC motor according to claim 19,
wherein the PWM signal generator includes a triangular wave generator which generates the positive phase triangular wave and the negative phase triangular wave, and a comparison unit which compares one of the indicative voltages with one of the triangular waves so as to generate the PWM signal.

22. A rotation drive control system of a three-phase DC motor according to claim 19,
wherein when the third indicative voltage is between the second indicative voltage and the first indicative voltage, the third PWM signal is generated by comparing the negative phase triangular wave with the third indicative voltage, the second PWM signal is generated by comparing the positive phase triangular wave with the second indicative voltage, and the first PWM signal is generated by comparing the positive phase triangular wave with the first indicative voltage.

23. A rotation drive control system of a three-phase DC motor according to claim 22, further including a sample-and-hold signal generator,
wherein when the first indicative voltage is between the second indicative voltage and the third indicative voltage, the sample-and-hold signal generator generates a sample-and-hold signal to follow each of rising edges and falling edges of the first PWM signal, so as to provide a detection timing in connection with the current detection,
wherein when the second indicative voltage is between the first indicative voltage and the third indicative voltage, the sample-and-hold signal generator generates a sample-and-hold signal to follow each of rising edges and falling edges of the second PWM signal, so as to provide a detection timing in connection with the current detection,
wherein when the third indicative voltage is between the second indicative voltage and the first indicative voltage, the sample-and-hold signal generator generates a sample-and-hold signal to follow each of rising edges and falling edges of the third PWM signal, so as to provide a detection timing in connection with the current detection.

24. A rotation drive control system of a three-phase DC motor according to claim 19,
wherein the third indicative voltage is set as a first fixed signal so as to set the third PWM signal as a second fixed signal to a 100% or 0% duty.

25. A rotation drive control system of a three-phase DC motor according to claim 24, further including a sample-and-hold signal generator which generates a sample-and-hold signal to follow each of peak points of the positive phase triangular wave and the negative phase triangular wave so as to provide a detection timing in connection with the current detection.

26. A method of starting up a three-phase DC motor including three-phase coils and a rotor comprising:
generating a first current to flow through each of any two phases of the three-phase coils to detect a polarity of an induced voltage induced in a de-energized phase of the three-phase coils by a drive control unit driving and controlling the three-phase DC motor, thereby determining a direction of energization and corresponding two phase coils through which a second current flows to rotate the rotor;
based upon determining that any two detected levels of the induced voltages are larger than a predetermined level, determining the direction of energization and the corresponding two phase coils by using two detected polarities of the induced voltages in connection with said any two detected levels thereby rotating the rotor based upon the direction of energization and the corresponding two phase coils thereof are determined; and
driving the three-phase DC motor based upon a first determination in connection with the direction of the energization and the corresponding two phase coils,
wherein the rotor does not response by the first current, and
wherein a step of the determining includes: based upon determining that said any two detected levels of the induced voltages are larger than the predetermined level, determining the direction of the energization and the corresponding two phase coils by inverting a detection result of a polarity of an induced voltage of the de-energized phase of the three-phase coils, the de-energized phase whose induced voltage is smaller than the predetermined level.

* * * * *